US012706651B2

(12) United States Patent
Jo et al.

(10) Patent No.: US 12,706,651 B2
(45) Date of Patent: Aug. 11, 2026

(54) METHOD, TRANSMISSION DEVICE, PROCESSING APPARATUS, AND STORAGE MEDIUM FOR TRANSMITTING CHANNEL STATE INFORMATION, AND METHOD AND RECEPTION DEVICE FOR RECEIVING CHANNEL STATE INFORMATION

(71) Applicant: LG ELECTRONICS INC., Seoul (KR)

(72) Inventors: Minseok Jo, Seoul (KR); Sangrim Lee, Seoul (KR); Ikjoo Jung, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 18/710,036

(22) PCT Filed: Nov. 17, 2021

(86) PCT No.: PCT/KR2021/016867
§ 371 (c)(1),
(2) Date: May 14, 2024

(87) PCT Pub. No.: WO2023/090474
PCT Pub. Date: May 25, 2023

(65) Prior Publication Data
US 2025/0007587 A1 Jan. 2, 2025

(51) Int. Cl.
*H04B 7/06* (2006.01)
*H04B 7/0456* (2017.01)
*H04B 17/391* (2015.01)

(52) U.S. Cl.
CPC ......... *H04B 7/0626* (2013.01); *H04B 7/0456* (2013.01); *H04B 7/0636* (2013.01); *H04B 17/3913* (2015.01)

(58) Field of Classification Search
CPC .. H04B 7/0626; H04B 7/0417; H04B 7/0456; H04B 7/0639; H04B 7/0658; H04B 7/06
See application file for complete search history.

(56) References Cited

U.S. PATENT DOCUMENTS

2011/0269490 A1 11/2011 Earnshaw et al.
2014/0029533 A1 1/2014 Han et al.
(Continued)

FOREIGN PATENT DOCUMENTS

KR 10-2020-0015941 2/2020
KR 10-2127021 6/2020

OTHER PUBLICATIONS

PCT International Application No. PCT/KR2021/016867, Written Opinion and International Search Report dated Aug. 4, 2022, 8 pages.

*Primary Examiner* — Nam T Huynh
(74) *Attorney, Agent, or Firm* — LEE, HONG, DEGERMAN, KANG & WAIMEY

(57) ABSTRACT

A transmission device in a wireless communication system: determines an encoder having S outputs from among encoders supported by the transmission device, on the basis of the number B of feedback bits, wherein B=S×Q; encodes CSI through the encoder to output S real number values; determines B-bit encoded CSI including Q bits indicating the S real number values, respectively; and transmits the B-bit encoded CSI. The encoders may have different numbers of outputs from each other, and the different numbers of outputs may be predetermined for different feedback bit number ranges.

9 Claims, 15 Drawing Sheets

(56) References Cited

U.S. PATENT DOCUMENTS

2014/0169204 A1 6/2014 Cheng et al.
2023/0155702 A1* 5/2023 Wang .................. H04B 17/391
370/252

* cited by examiner

Figure 1:
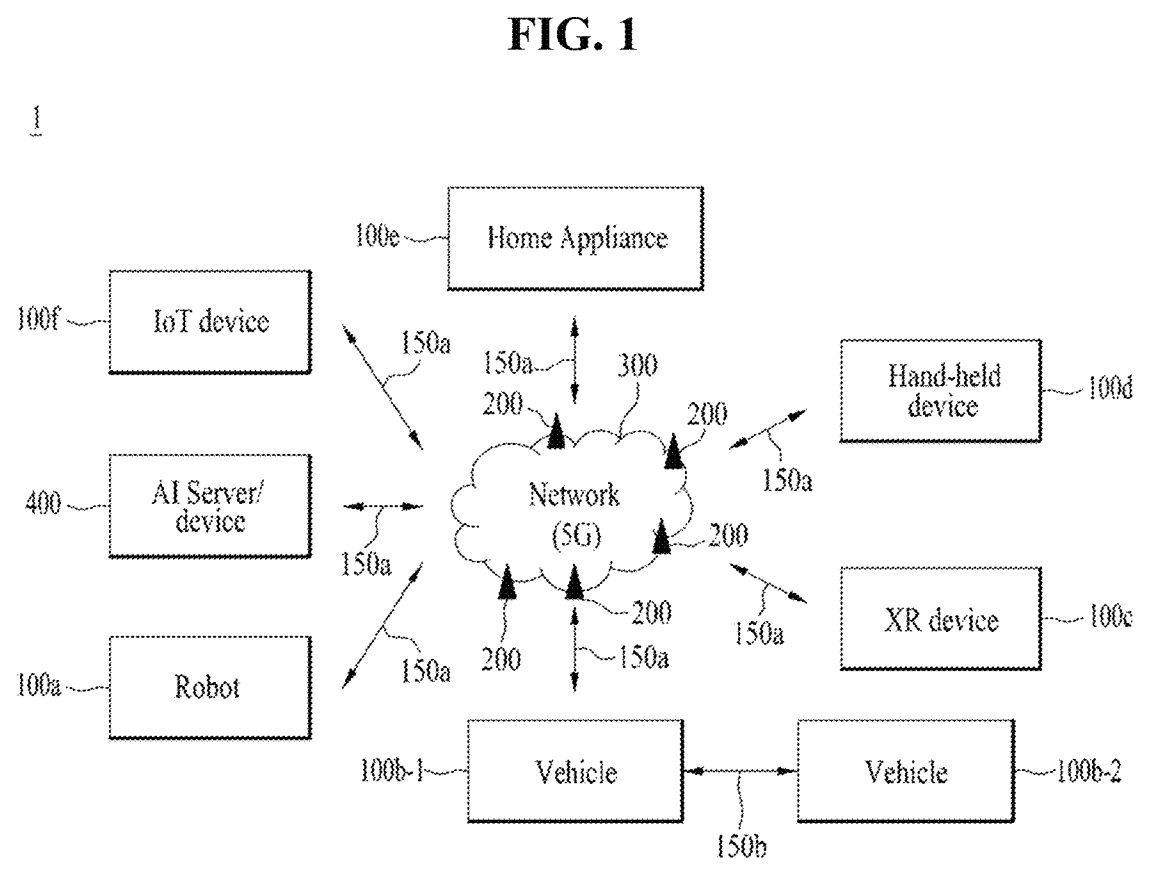

Robot
100a

Vehicle
100b-1

Vehicle
100b-2

XR device
100c

Hand-held device
100d

Home Appliance
100e

IoT device
100f

AI Server/ device
400

Network (5G)
300

200

150a

150b

UE 1

...

UE K $H_1$ $H_K$

BS

METHOD, TRANSMISSION DEVICE, PROCESSING APPARATUS, AND STORAGE MEDIUM FOR TRANSMITTING CHANNEL STATE INFORMATION, AND METHOD AND RECEPTION DEVICE FOR RECEIVING CHANNEL STATE INFORMATION

CROSS-REFERENCE TO RELATED APPLICATION(S)

This application is the National Stage filing under 35 U.S.C. 371 of International Application No. PCT/KR2021/016867, filed on Nov. 17, 2021, the contents of which is hereby incorporated by reference herein in its entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation (e.g., 5G) communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

While 5G communication is still under development, there is an increasing demand for higher data rates to accommodate new services such as virtual reality and autonomous driving.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

There is a demand for methods of appropriately applying neural network (NN) technology to communication to meet the requirements for higher data rates.

The objects to be achieved with the present disclosure are not limited to what has been particularly described hereinabove and other objects not described herein will be more clearly understood by persons skilled in the art from the following detailed description.

In an aspect of the present disclosure, provided herein is a method of transmitting channel state information (CSI) by a transmitting device in a wireless communication system. The method includes: determining an encoder with S outputs among encoders supported by the transmitting device based on a number of feedback bits B, where B=S×Q; outputting S real-valued numbers by encoding the CSI through the encoder; determining B-bit encoded CSI including Q bits representing a respective one of the S real-valued numbers, respectively; and transmitting the B-bit encoded CSI. The encoders have different numbers of outputs and are predetermined for different ranges of numbers of feedback bits.

In another aspect of the present disclosure, provided herein is a transmitting device configured to transmit CSI in a wireless communication system. The transmitting device includes: at least one transceiver; at least one processor; and at least one computer memory operably connected to the at least one processor and configured to store instructions that, when executed, cause the at least one processor to perform operations. The operations include: determining an encoder with S outputs among encoders supported by the transmitting device based on a number of feedback bits B, where B=S×Q; outputting S real-valued numbers by encoding the CSI through the encoder; determining B-bit encoded CSI including Q bits representing a respective one of the S real-valued numbers, respectively; and transmitting the B-bit encoded CSI. The encoders have different numbers of outputs and are predetermined for different ranges of numbers of feedback bits.

In another aspect of the present disclosure, provided herein is a processing device. The processing device includes: at least one processor; and at least one computer memory operably connected to the at least one processor and configured to store instructions that, when executed, cause the at least one processor to perform operations. The operations include: determining an encoder with S outputs among encoders supported by the transmitting device based on a number of feedback bits B, where B=S×Q; outputting S real-valued numbers by encoding the CSI through the encoder; determining B-bit encoded CSI including Q bits representing a respective one of the S real-valued numbers, respectively; and transmitting the B-bit encoded CSI. The encoders have different numbers of outputs and are predetermined for different ranges of numbers of feedback bits.

In another aspect of the present disclosure, provided herein is a computer-readable non-transitory storage medium. The computer-readable non-transitory storage medium is configured to store at least one computer program including instructions that, when executed by at least one processor, cause the at least one processor to perform operations for a user equipment (UE). The operations include: determining an encoder with S outputs among encoders supported by the transmitting device based on a number of feedback bits B, where B=S×Q; outputting S real-valued numbers by encoding the CSI through the encoder; determining B-bit encoded CSI including Q bits representing the S real-valued numbers, respectively; and transmitting the B-bit encoded CSI. The encoders have different numbers of outputs and are predetermined for different ranges of numbers of feedback bits.

In another aspect of the present disclosure, provided herein is a computer program stored in a computer program readable storage medium. The computer program includes at least one program code including instructions that, when executed, cause at least one processor to perform operations. The operations include: determining an encoder with S outputs among encoders supported by the transmitting device based on a number of feedback bits B, where B=S×Q; outputting S real-valued numbers by encoding the CSI through the encoder; determining B-bit encoded CSI including Q bits representing a respective one of the S real-valued numbers, respectively; and transmitting the B-bit encoded CSI. The encoders have different numbers of outputs and are predetermined for different ranges of numbers of feedback bits.

In each aspect of the present disclosure, the operations may further include transmitting information regarding the encoders.

In each aspect of the present disclosure, the information regarding the encoders may include a number of outputs supported by the transmitting device.

In another aspect of the present disclosure, provided herein is a method of receiving CSI by a receiving device in a wireless communication system. The method includes: determining a decoder with S inputs for each of transmitting devices among decoders supported by the receiving device based on a number of feedback bits B (e.g., determining a decoder with K×S inputs for K transmitting devices); receiving B-bit encoded CSI from a transmitting device; determining S real-valued numbers based on S×Q bits in the encoded CSI; and determining a precoding matrix by decoding the S real-valued numbers through the decoder. The decoders have different numbers of inputs and are predetermined for different ranges of numbers of feedback bits.

In a further aspect of the present disclosure, provided herein is a receiving device configured to receive CSI in a wireless communication system. The receiving device includes: at least one transceiver; at least one processor; and at least one computer memory operably connected to the at least one processor and configured to store instructions that, when executed, cause the at least one processor to perform operations. The operations include: determining a decoder with S inputs for each of transmitting devices among decoders supported by the receiving device based on a number of feedback bits B (e.g., determining a decoder with K×S inputs for K transmitting devices); receiving B-bit encoded CSI from a transmitting device; determining S real-valued numbers based on S×Q bits in the encoded CSI; and determining a precoding matrix by decoding the S real-valued numbers through the decoder. The decoders have different numbers of inputs and are predetermined for different ranges of numbers of feedback bits.

In each aspect of the present disclosure, the operations may further include receiving information regarding encoders supported by the transmitting device from the transmitting device.

In each aspect of the present disclosure, the information regarding the encoders may include a number of outputs supported by the transmitting device.

In each aspect of the present disclosure, the operations may further include performing downlink transmission to the transmitting device based on the precoding matrix.

The foregoing solutions are merely a part of the examples of the present disclosure and various examples into which the technical features of the present disclosure are incorporated may be derived and understood by persons skilled in the art from the following detailed description.

According to implementations of the present disclosure, a wireless communication signal may be efficiently transmitted/received. Accordingly, the overall throughput of a wireless communication system may be improved.

According to implementations of the present disclosure, a wireless communication system may efficiently support various services with different requirements.

According to implementations of the present disclosure, delay/latency occurring during wireless communication between communication devices may be reduced.

According to implementations of the present disclosure, encoder-decoder neural networks that are suitable for a feedback capacity may be used while ensuring relatively robust encoding/decoding performance in response to changes in the feedback capacity.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 1 illustrates an example of a communication system 1 to which implementations of the present disclosure are applied;

DETAILED DESCRIPTION

Figure 2:
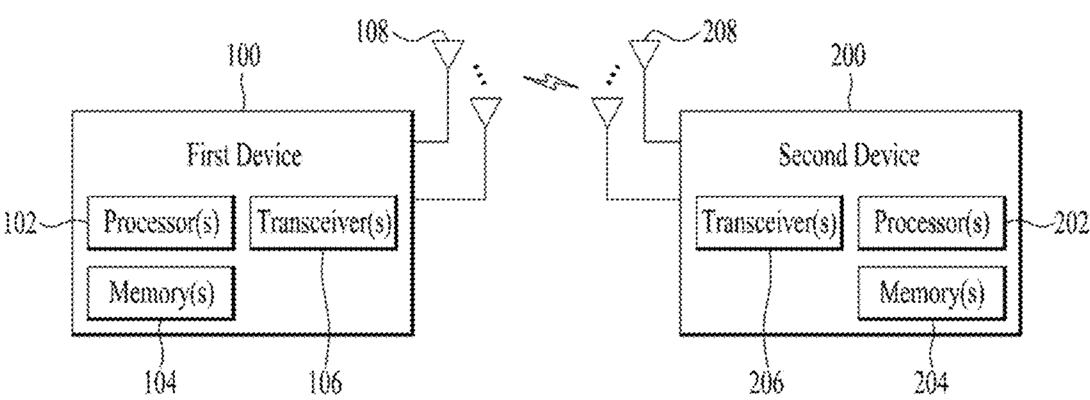
FIG. 2 is a block diagram illustrating examples of communication devices capable of performing a method according to the present disclosure.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, the term user is used to refer to a UE. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a transmission and reception point (TRP) refers to a fixed point capable of transmitting/receiving a radio signal to/from a UE by communication with the UE. Various types of BSs may be used as TRPs regardless of the names thereof. For example, a BS, NB, eNB, pico-cell eNB (PeNB), home eNB (HeNB), relay, repeater, etc. may be a TRP. Furthermore, a TRP may not be a BS. For example, a radio remote head (RRH) or a radio remote unit (RRU) may be a TRP. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per TRP. An antenna may refer to a physical antenna port or refer to a virtual antenna or an antenna group. The TRP may also be called a point.

In the present disclosure, a cell refers to a specific geographical area in which one or more TRPs provide communication services. Accordingly, in the present disclosure, communication with a specific cell may mean communication with a BS or a TRP providing communication services to the specific cell. A DL/UL signal of the specific cell refers to a DL/UL signal from/to the BS or the TRP providing communication services to the specific cell. A cell providing UL/DL communication services to a UE is especially called a serving cell. Furthermore, channel status/quality of the specific cell refers to channel status/quality of a channel or a communication link generated between the BS or the TRP providing communication services to the specific cell and the UE. In 3GPP-based communication systems, the UE may measure a DL channel state from a specific TRP using cell-specific reference signal(s) (CRS(s)) transmitted on a CRS resource and/or channel state information reference signal(s) (CSI-RS(s)) transmitted on a CSI-RS resource, allocated to the specific TRP by antenna port(s) of the specific TRP.

A 3GPP-based communication system uses the concept of a cell in order to manage radio resources, and a cell related with the radio resources is distinguished from a cell of a geographic area.

The "cell" of the geographic area may be understood as coverage within which a TRP may provide services using a carrier, and the "cell" of the radio resources is associated with bandwidth (BW), which is a frequency range configured by the carrier. Since DL coverage, which is a range within which the TRP is capable of transmitting a valid signal, and UL coverage, which is a range within which the TRP is capable of receiving the valid signal from the UE, depend upon a carrier carrying the signal, coverage of the TRP may also be associated with coverage of the "cell" of radio resources used by the TRP. Accordingly, the term "cell" may be used to indicate service coverage by the TRP sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. In this case, the carrier frequency may be equal to or different from a center frequency of each cell or CC.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., a set of resource elements (REs)) that carry downlink control information (DCI), and the PDSCH refers to a set of time-frequency resources (e.g., a set of REs) that carry DL data. The PUCCH, PUSCH, and PRACH refer to a set of time-frequency resources (i.e., a set of REs) that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

Since a communication device receives an SS/PBCH resource block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, not receiving physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using radio access technology (RAT) (e.g., 5G New RAT (NR) or LTE (e.g., E-UTRA), 6G) and may be referred to as communication/radio/5G devices. The wireless devices may include, without being limited to, a robot 100_a_, vehicles 100_b_-1 and 100_b_-2, an extended reality (XR) device 100_c_, a hand-held device 100_d_, a home appliance 100_e_, an Internet of Things (IoT) device 100_f_, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a BS/network node with respect to another wireless device.

The wireless devices 100_a_ to 100_f_ may be connected to a network 300 via BSs 200. AI technology may be applied to the wireless devices 100_a_ to 100_f_ and the wireless devices 100_a_ to 100_f_ may be connected to the AI server 400 via the network 300. The network 300 may be configured using a 3G network, a 4G (e.g., LTE) network, or a 5G (e.g., NR) network or 6G network to be introduced in the future. Although the wireless devices 100_a_ to 100_f_ may communicate with each other through the BSs 200/network 300, the wireless devices 100_a_ to 100_f_ may perform direct communication (e.g., sidelink communication) with each other without passing through the BSs/network. For example, the vehicles 100_b_-1 and 100_b_-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100_a_ to 100_f_.

Wireless communication/connections 150_a_ and 150_b_ may be established between the wireless devices 100_a_ to 100_f_ and the BSs 200 and between the wireless devices 100_a_ to 100_f_). Here, the wireless communication/connections such as UL/DL communication 150_a_ and sidelink communication 150_b_ (or, device-to-device (D2D) communication) may be established by various RATs. The wireless devices and the BSs/wireless devices may transmit/receive radio signals to/from each other through the wireless communication/connections 150_a_ and 150_b_. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs. Here, {the first wireless device 100 and the second wireless device 200} may correspond to {the wireless device 100_x_ and the BS 200} and/or {the wireless device 100_x_ and the wireless device 100_x_} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement wireless communication technology. The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the afore/below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the afore/below-described/proposed procedures and/or methods. Here, the processor(s) 202 and the memory(s) 204 may be a part of a communication modem/circuit/chip designed to implement wireless communication technology. The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
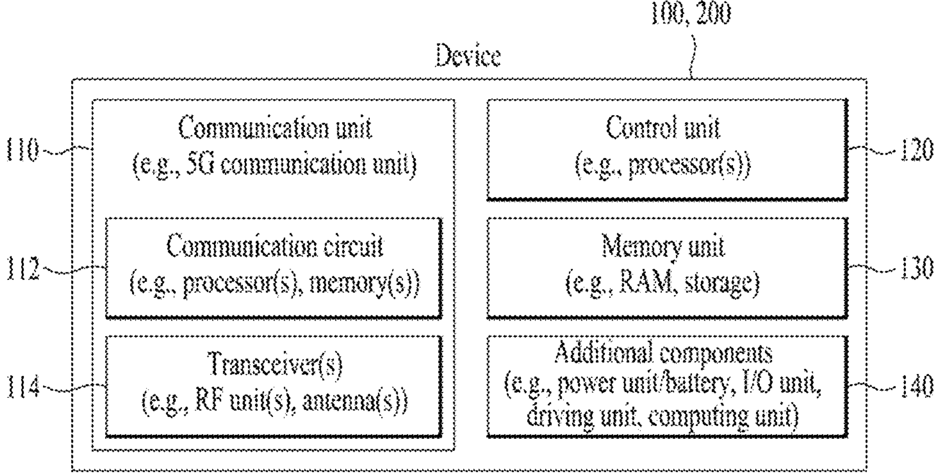
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a transitory memory, a non-transitory memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-transitory) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-transitory) storage medium A communication device of the present disclosure includes at least one processor; and at least one computer memory operably connected to the at least one processor and configured to store instructions for causing, when executed, the at least one processor to perform operations according to example(s) of the present disclosure described later.

Wireless communication systems are extensively deployed to provide various types of communication services such as voice and data. The demand for higher data rates is increasing to accommodate incoming new services and/or scenarios where the virtual and real worlds blend. To address these ever-growing demands, new communication technologies beyond 5G are required. New communication technologies beyond 6G systems (hereinafter referred to as 6G) aim to achieve (i) extremely high data speeds per device, (ii) very large number of connected devices, (iii) global connectivity, (iv) ultra-low latency, (v) reducing energy consumption of battery-free IoT devices, (vi) ultra-reliable connections, (vii) connected intelligence with machine learning capabilities. In the 6G system, the following technologies are being considered: artificial intelligence (AI), terahertz (THz) communication, optical wireless communication (OWC), free space optics (FSO) backhaul network, massive multiple-input multiple-output (MIMO) technology, blockchain, three-dimensional (3D) networking, quantum communication, unmanned aerial vehicle (UAV), cell-free communication, integration of wireless information and energy transmission, integration of sensing and communication, integration of access backhaul networks, hologram beamforming, big data analysis, large intelligent surface (LIS), and so on.

In particular, there has been a rapid increase in attempts to integrate AI into communication systems. Methods being attempted in relation to AI may be broadly categorized into two: AI for communications (AI4C), which uses AI to enhance communication performance, and communications for AI (C4AI), which develops communication technologies to support AI. In the AI4C field, designs have been attempted to replace the roles of channel encoders/decoders, modulators/demodulators, or channel equalizers with end-to-end autoencoders or neural networks. In the C4AI field, as one type of distributed learning, federated learning involves updating a common prediction model by sharing only the weights and gradients of models with the server without sharing device raw data while protecting privacy.

Introducing AI into communications may simplify and enhance real-time data transmission. AI may use numerous analytics to determine a method of performing complex target tasks. In other words, AI may increase efficiency and reduce processing delays.

Time-consuming tasks such as handover, network selection, and resource scheduling may be instantly performed using AI. AI may also play a significant role in machine-to-machine, machine-to-human, and human-to-machine communications. AI-based communication systems may be supported by meta-materials, intelligent architectures, intelligent networks, intelligent devices, intelligence cognitive radio, self-sustaining wireless networks, and machine learning.

Recent attempts to integrate AI into wireless communication systems have primarily focused on the application layer, network layer, and particularly on wireless resource management and allocation. However, research into integrating AI into wireless communication systems is increasingly evolving towards the MAC layer and the physical layer. In particular, there are emerging attempts to combine deep learning with wireless transmission at the physical layer. AI-based physical layer transmission refers to applying signal processing and communication mechanisms based on AI drivers rather than traditional communication frameworks in fundamental signal processing and communication mechanisms. For example, the AI-based physical layer transmission may include deep learning-based channel coding and decoding, deep learning-based signal estimation and detection, deep learning-based MIMO mechanisms, AI-based resource scheduling and allocation, and the like.

Machine learning may be used for channel estimation and channel tracking. Machine learning can be used for power allocation, interference cancellation, etc. in the DL physical layer. Machine learning may also be used in MIMO systems for antenna selection, power control, and symbol detection.

However, applying deep neural networks for transmission at the physical layer may have the following issues.

Deep learning-based AI algorithms require a large amount of training data to optimize training parameters. However, due to limitations in acquiring data from specific channel environments, a significant amount of training data is often used offline. Static training of training data in specific channel environments may lead to contradictions between the dynamic features and diversity of wireless channels.

Furthermore, current deep learning primarily targets real signals. However, signals at the physical layer of wireless communication are complex signals. More research is needed on neural networks for detecting complex-domain signals to match the characteristics of wireless communication signals.

Hereinafter, machine learning will be described in detail.

Machine learning refers to a series of operations for training machines to perform tasks that are difficult to be performed by human. Machine learning requires data and learning models. In machine learning, data learning methods may be broadly categorized into three types: supervised learning, unsupervised learning, and reinforcement learning.

Neural network learning aims to minimize errors in outputs. Neural network learning refers to a process of repeatedly inputting training data to a neural network, calculating the error of the output and target of the neural network for the training data, backpropagating the error of the neural network from the output layer of the neural network to the input layer to reduce the error, and updating the weight of each node of the neural network.

Supervised learning may use training data labeled with a correct answer, whereas unsupervised learning may use training data that is not labeled with a correct answer. For example, in the case of supervised learning for data classification, training data may be labeled with each category. The labeled training data may be input to the neural network, and the output (category) of the neural network may be compared with the label of the training data, thereby calculating the error. The calculated error may be backpropagated through the neural network in reverse (that is, from the output layer to the input layer), and the connection weight(s) of each node of each layer of the neural network may be updated based on the backpropagation. Changes in the updated connection weight(s) of each node may be determined based on the learning rate. The calculation of the neural network for input data and the backpropagation of the error may configure a learning epoch. The learning data may be applied differently depending on the number of repetitions of the learning epoch of the neural network. For example, in the early phase of learning of the neural network, a high learning rate may be used to increase efficiency such that the neural network rapidly ensures a certain level of performance, but in the late phase of learning, a low learning rate may be used to increase accuracy.

The learning method may vary depending on the feature of data. For example, learning may be performed based on supervised learning rather than unsupervised learning or reinforcement learning to allow a receiver to accurately predict data transmitted from a transmitter in a communication system.

The learning model corresponds to the human brain. To this end, the most basic linear model may be considered. However, a machine learning paradigm that uses highly complex neural network structures such as artificial neural networks as learning models is referred to as deep learning.

Neural network cores used for learning may be broadly categorized into a deep neural network (DNN), a convolutional deep neural network (CNN), and a recurrent neural machine (RNN).

Figure 4:
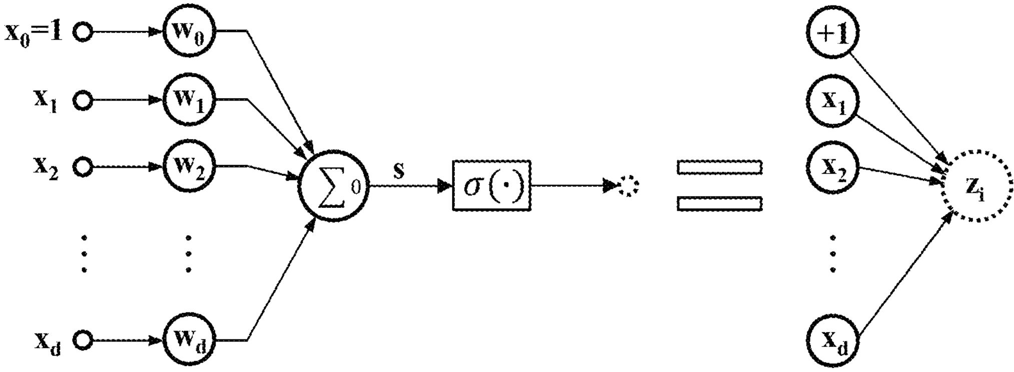
FIG. 4 illustrates a perceptron structure used in an artificial neural network.

FIG. 4 illustrates a perceptron structure used in an artificial neural network.

An artificial neural network may be implemented by connecting multiple perceptrons. Referring to FIG. 4, a process of receiving an input vector of $x=(x_1, x_2, \ldots, x_d)$, multiplying each component by a weight of $w=(w_1, w_2, \ldots, w_d)$, summing up the results, and then applying an activation function of $\sigma(\cdot)$ is referred to as a perceptron. For a large artificial neural network structure, the simplified perceptron structure shown in FIG. 14 may be extended. For a large artificial neural network structure, the simplified perceptron structure shown in FIG. 4 may be extended and applied to a multi-dimensional perceptron with different input vectors.

Figure 5:
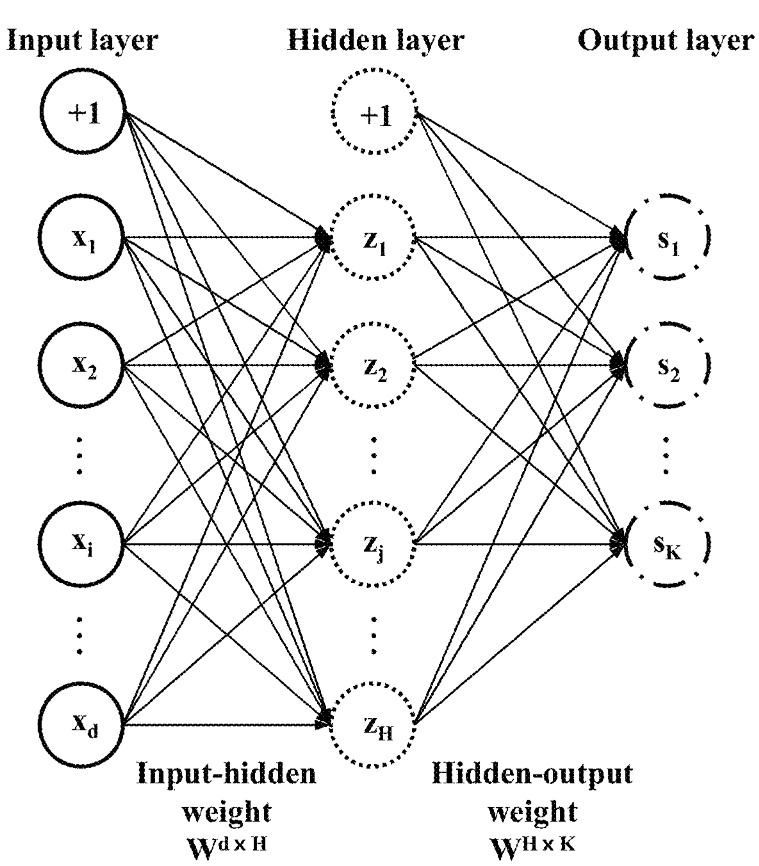
FIG. 5 illustrates a multilayer perceptron structure.

FIG. 5 illustrates a multilayer perceptron structure.

The perceptron structure shown in FIG. 4 may be extended to a multilayer perceptron structure having a total of three layers based on input and output values. An artificial neural network having H perceptrons of (d+1) dimensions between the first and second layers and K perceptrons of (H+1) dimensions between the second and third layers may be represented by the multilayer perceptron structure shown in FIG. 5.

A layer where input vectors are located is called an input layer, a layer where final output value(s) are located is called an output layer, and all layers between the input and output layers are referred to as hidden layers. In the example of FIG. 5, three layers are illustrated. However, since the actual number of layers in an artificial neural network is counted excluding the input layer, the artificial neural network based on the multilayer perceptron structure in FIG. 5 may be considered as having two layers. An artificial neural network is constructed by two-dimensionally connecting perceptrons of basic blocks.

In a neural network, layers are composed of small individual units called neurons. In the neural network, neurons receive inputs from other neurons, perform processing, and produce outputs. A region within the previous layer where each neuron receives inputs is called a receptive field. Each neuron computes output values by applying a specific function to input values received from the receptive field within the previous layer. The specific function applied to the input values is determined by i) a vector of weights and ii) biases. Learning in the neural network is performed based on iterative adjustment of the biases and weights. The vector of weights and the biases are called filters, which represent particular features of the input.

The aforementioned input layer, hidden layer, and output layer may be commonly applied not only to the multilayer perceptron structure but also to various artificial neural network structures such as CNNs, which will be discussed later. As the number of hidden layers increases, the artificial neural network becomes deeper, and the machine learning paradigm that uses sufficiently deep artificial neural networks as learning models is called deep learning. In addition, an artificial neural network used for deep learning are called DNNs.

The aforementioned multilayer perceptron structure is referred to as a fully-connected neural network. In the fully-connected neural network, there are no connections between neurons within the same layer, and connections exist only between neurons in adjacent layers. A DNN, which has the fully-connected neural network structure, includes multiple hidden layers and combinations of activation functions, and thus the DNN may be effectively applied to capture the characteristics of correlation between inputs and outputs. Here, the correlation characteristic may mean the joint probability of inputs and outputs.

On the other hand, various artificial neural network structures distinct from the DNN may be formed depending on how multiple perceptrons are connected to each other.

Figure 6:
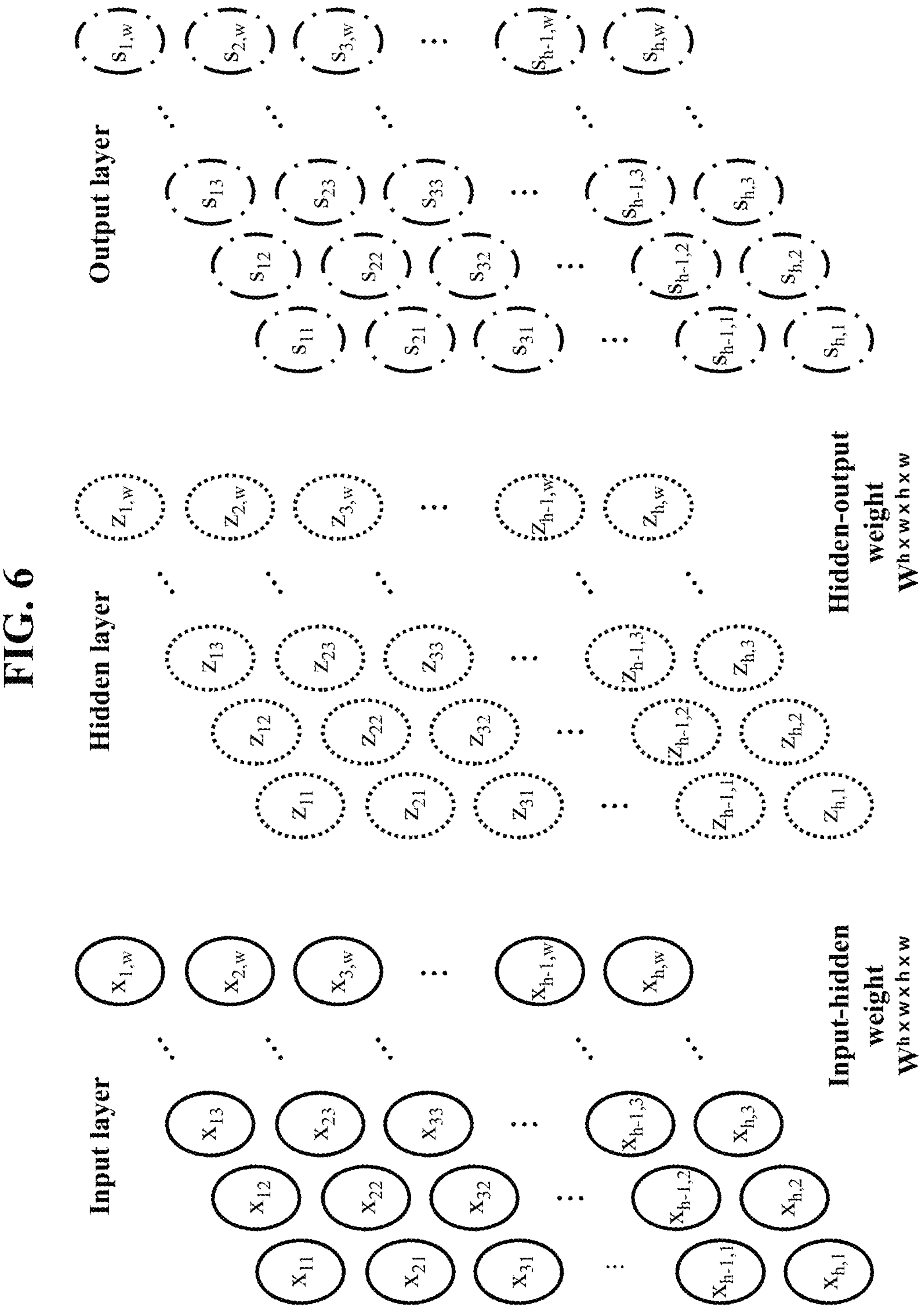
FIG. 6 illustrates the structure of a convolutional neural network (CNN)

FIG. 6 illustrates the structure of a CNN.

In a DNN, neurons within a layer are arranged in a one-dimensional manner. However, referring to FIG. 6, in the CNN, neurons may be assumed to be arranged in a two-dimensional manner, with w neurons horizontally and h neurons vertically. In this case, since a weight is added for each connection from a single input neuron to hidden layers, a total of h×w weights need to be considered. Since there are h×w neurons in input layers, a total of $h^2w^2$ weights are required between two adjacent layers.

Figure 7:
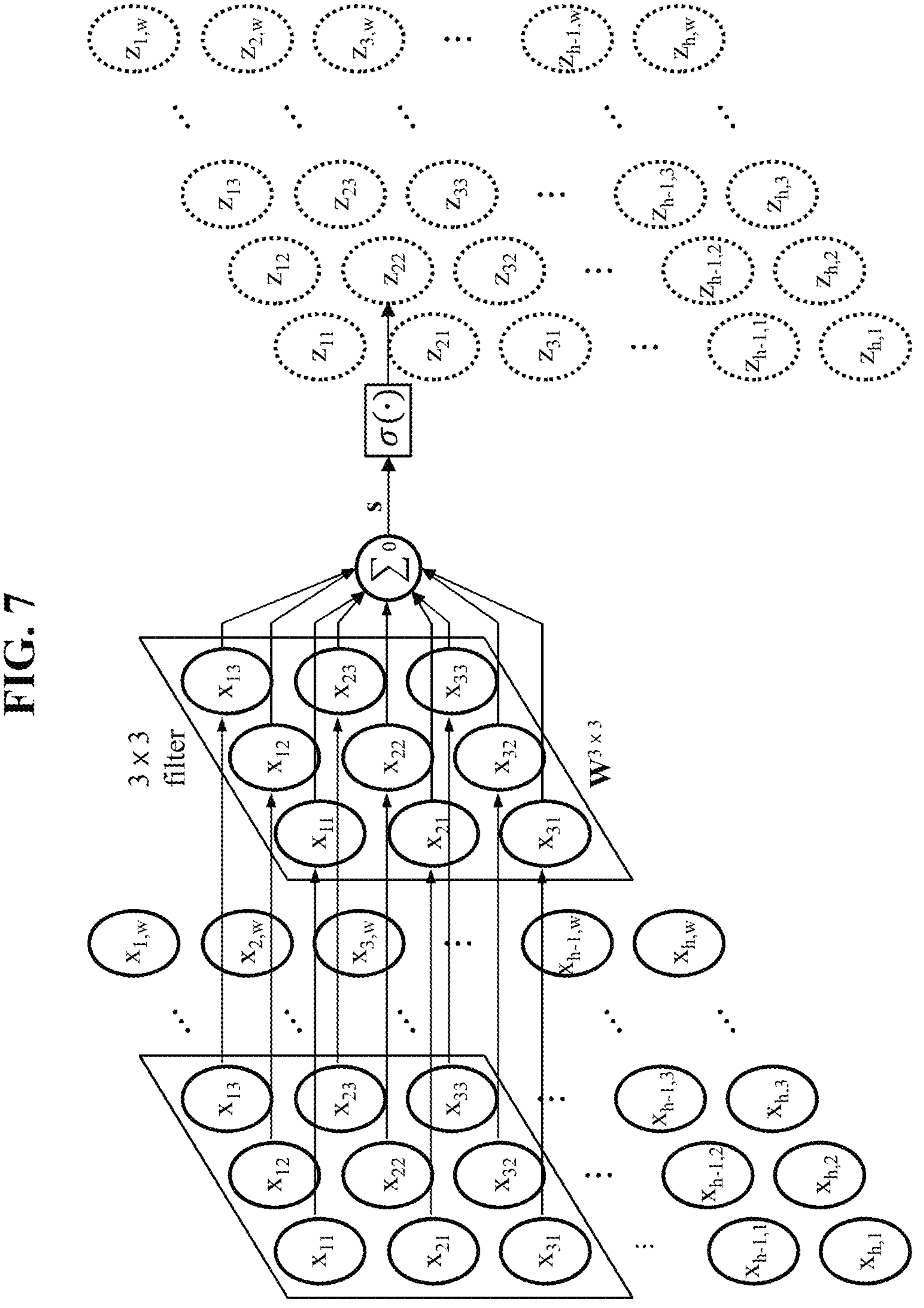
FIG. 7 illustrates a filtering operation in a CNN.

FIG. 7 illustrates a filtering operation in a CNN.

The CNN shown in FIG. 6 faces the issue of an exponential increase in the number of weights depending on the number of connections. Thus, small-sized filters are assumed to exist instead of considering connections between all neurons in adjacent layers. Then, weighted sum and activation function operations are performed on overlapping regions of filter as shown in FIG. 7.

A single filter has weights corresponding to the size of the filter and may undergo learning of the weights such that the filter extracts specific features from an image as factors and produce outputs based on the factors. In FIG. 7, a 3×3 filter is applied to a top-left 3×3 region of an input layer, and an output value obtained by performing the weighted sum and activation function operations on related neurons is stored in $z_{22}$.

The filter scans the input layer, performs the weighted sum and activation function operations while moving horizontally and vertically at regular intervals, and places the output value at the current position of the filter. This operation method is similar to a convolution operation on images in the field of computer vision. Thus, a DNN with such a structure is called a CNN, and a hidden layer generated by the convolution operation is referred to as a convolutional layer. In addition, a neural network with multiple convolutional layers is called a deep convolutional neural network (DCNN).

In the convolutional layer, the weighted sum is calculated by considering only neuron(s) located within a region covered by the current filter, thereby reducing the number of weights. As a result, a single filter may focus on features within a local region. Therefore, the CNN may be effectively applied to process image data where a physical distance in two-dimensional space is an important criterion. In the CNN, multiple filters may be applied immediately before the convolutional layer, and multiple output results may be produced by convolution operations of each filter The CNN may be divided into a part for extracting features from data and a part for classifying classes. In the CNN, the part for extracting features from data (hereinafter referred to as a feature extraction region) may be structured by stacking the following layers multiple times: an essential convolutional layer and an optional pooling layer. As the final part of the CNN, a fully connected layer for classifying classes is added. There is a flattening layer that converts image-type data into an array format between the part for extracting features from data and the part for classifying data.

As described above, the convolutional layer applies filters to input data and then incorporates the activation function, and the pooling layer is positioned after the convolutional layer. In the CNN, filters are also referred to as kernels. In the CNN, the filter performs the convolution operation by traversing the input data at specified intervals. The filter applied in the convolutional layer may create a feature map by moving at the specified intervals and performing the convolution operation on the entirety of the input data. For example, referring to FIG. 7, the output values: $z_{11}$ to $z_{h,w}$ may constitute the feature map. If multiple filters are applied to the convolutional layer, the convolution operation is performed for each filter, and the feature map may be created based on the sum of convolutions from the multiple filters. The feature map is also referred to as an activation map. In other words, the CNN consist of an input layer, hidden layers, and an output layer. In the CNN, the hidden layers include layers performing convolutions. Typically, the layer performing the convolution computes a dot product between a convolution kernel and the input matrix of the layer, and the activation function of the layer is commonly a rectified linear unit (ReLU). As the convolutional kernel slides over the input matrix of the layer, the convolution operation creates a feature map that contributes to the input of the next layer.

The pooling layer uses output data from the convolutional layer (e.g., feature map) as input data and reduces the size of the input data or emphasizes specific data. In the pooling layer, the following methods are used to process data: max pooling, which collects the maximum value of values within a specific region of a square matrix; average pooling, which calculates the average of values within a specific region of a square matrix; and min pooling, which determines the minimum value of values within a specific region of a square matrix.

The fully connected layer connects every neuron in one layer to every neuron in another layer.

In a wireless communication system, the BS may request UEs (i.e., users) within the coverage of the BS to report channel state information (CSI) on TRP(s) controlled by the BS. Each UE may calculate CSI based on RS(s) transmitted by the TRP(s) and report the CSI to the BS. The BS may perform scheduling for UE(s) based on the CSI received from the UEs.

For example, the CSI may include the following indicators/reports: channel quality indicator (CQI), precoding matrix indicator (PMI), and/or rank indicator (RI).

Figures 8, 9:
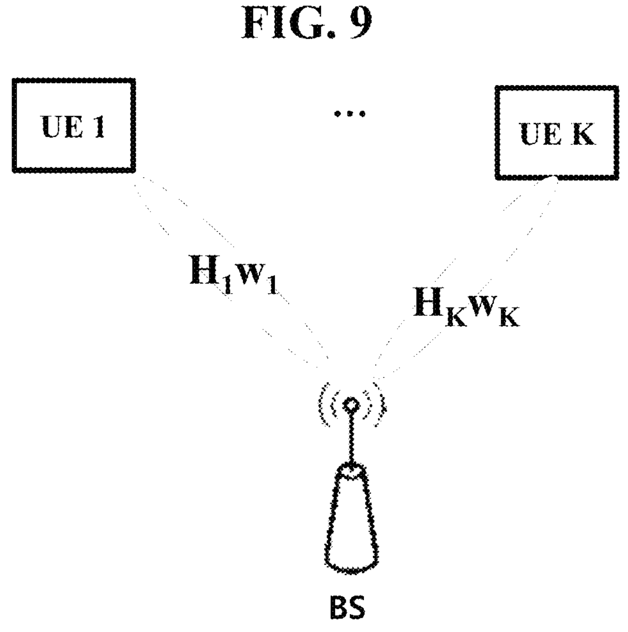
FIGS. 8 and 9 illustrate channel and beam matrices formed between a transmission and reception point (TRP) and user equipments (UEs)

FIGS. 8 and 9 illustrate channel and beam matrices formed between a TRP and UEs.

A channel state may be represented by a channel matrix. It is assumed that a channel matrix representing the channel state between a TRP and UE i is $H_i$. When the TRP applies a precoder $w_i$ to transmit to UE i, the transmission reaches UE i through a beam represented by a matrix $H_i w_i$. Before the application of the precoding matrix, the transmission signal from the TRP reaches UE i over the channel represented by $H_i$. After the application of precoder $w_1$, the transmission signal reaches UE i over the channel represented by $H_i w_i$. UE i may determine a channel matrix based on RSs for channel measurement from TRP(s), select a precoder capable of adjusting the phase, amplitude, etc., of a DL signal in a direction favorable to the UE, and provide feedback on the precoder favorable when the BS transmits a signal to the corresponding UE, i.e., a PMI to the BS.

In conventional wireless communication systems, CSI is independently estimated and quantized by each UE and then reported to the BS. Recently, the use of neural networks (NN) is being considered for efficient and distributed channel estimation, quantization, feedback, and DL multiuser precoding in large-scale MIMO systems where the BS serves multiple UEs.

Hereinafter, an NN-based precoding system will be described. In the following description, lowercase or uppercase italic letters represent scalars, while lowercase bold letters and uppercase bold letters represent vectors and matrices, respectively. Calligraphic letters represent sets. For example, x, x, X, and $\mathbb{X}$ represent a scalar, vector, matrix, and set, respectively. In addition, $\mathbb{C}$ represents a set of complex numbers, and $\mathbb{C}^{m\times n}$ represents an (m×n)-dimensional complex space. Further, I represents an identity matrix of appropriate dimensions, and Superscript$(\cdot)^H$ represents the Hermitian transpose. $\mathrm{Tr}(\cdot)$ and $\mathbb{E}[\cdot]$ represent the trace and expectation operators, respectively, and $\|\cdot\|_2$ represents the Euclidean norm of a vector. $\mathcal{CN}(0, R)$ represents the zero-mean circularly symmetric complex Gaussian distribution with a covariance matrix R.

Figure 10:
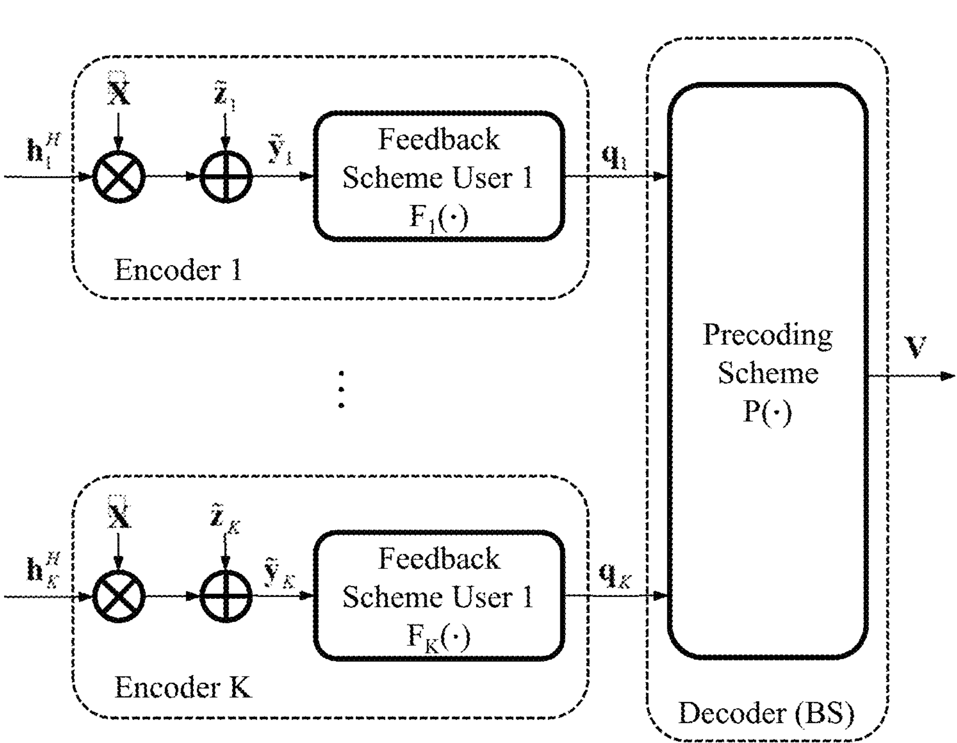
FIG. 10 illustrates an end-to-end multiuser downlink precoding system.

FIG. 10 illustrates an end-to-end multiuser DL precoding system.

Referring to FIG. 10, the end-to-end multiuser precoding system may include a total of UE-side encoders and a BS-side decoder.

The present disclosure considers a DL precoding system where frequency-division duplex (FDD) and finite feedback rates, i.e., rate-limited feedback are assumed. In addition, the number of transmission antennas at the BS is denoted as M, and it is assumed that there are K single-antenna users (i.e., K single-antenna UEs) (where K<M).

In the present disclosure, a signal transmitted by the BS is denoted as x, and a symbol for a k-th user is represented by $s_k \in \mathbb{C}^M$, and a precoding vector for the k-th user is denoted as $v_k \in \mathbb{C}^M$. A precoding matrix $V \in \mathbb{C}^{M\times K}$ with a k-th column $v_k$ may be defined, and a vector s having a symbol $s_k$ transmitted to the k-th user as a k-th element may be defined. In this case, the transmission signal may be expressed as $$x = \sum_{k=1}^{K} v_k s_k = Vs.$$

That is, linear precoding is performed by the BS. Additionally, for precoding and symbols, the following constraints may be imposed: a total power constraint is $\mathrm{Tr}(VV^H) \leq P$ and the symbol $s_k$ is normalized such that $\mathbb{E}[ss^H]=I$ to ensure no correlation between symbols of different users.

A DL channel gain between the BS and the k-th user is denoted as $h_k \in \mathbb{C}^M$. In this case, narrowband block-fading may be assumed. The signal received at the k-th user is given by $$y_k = h_k^H v_k s_k + \sum_{j\neq k} h_k^H v_j s_j + z_k,$$

where $z_k \sim \mathcal{CN}(0, \sigma^2)$ represents the additive white Gaussian noise (AWGN) at the k-th user. Therefore, an achievable rate for the k-th user may be calculated as follows.

$$R_k = \log_2\left(1 + \frac{|h_k^H v_k|^2}{\sum_{j\neq k} |h_k^H v_j|^2 + \sigma^2}\right) \quad \text{[Equation 1]}$$

To achieve the theoretically possible achievable rate in actual communication scenarios, additional methods may be appropriately used along with some implementations considered and described in the present disclosure. In addition, various quality of service (QoS) metrics including the achievable rate may be considered as indicators of communication performance.

To maximize a sum rate $R=\Sigma_k R_k$ (or optimize other communication QoS), an encoder and decoder may be appropriately designed as shown in FIG. 10. In addition, an encoder and decoder may be configured with NNs to find the optimal encoder and decoder.

To allow the BS to determine the optimal precoding matrix, it is crucial that the BS has instantaneous access to CSI. In the present disclosure, the BS acquires CSI through DL training and feedback. In particular, a DL training phase is considered before a data transmission phase to obtain information required for DL precoding at the BS. For example, in the DL training phase preceding the data transmission phase, the BS may transmit DL training pilots $\tilde{X} \in \mathbb{C}^{M\times L}$ with a pilot length of L. In this case, pilots transmitted within an l-th column of $\tilde{X}$, i.e., l-th pilot transmission $\tilde{x}_l$ satisfy per-transmission power constraint $$\|\tilde{x}_l\|_2^2 \leq P.$$

A signal $\widetilde{y_k} \in \mathbb{C}^{1\times L}$ with a length L, which is observed and received at user k, may be expressed as follows.

$$\widetilde{y_k} = h_k^H \tilde{X} + \widetilde{z_k} \quad \text{[Equation 2]}$$

In Equation 2, $\widetilde{z_k} \sim \mathcal{CN}(0,\sigma^2 I)$ represents the AWGN at user k.

If the feedback scheme adopted by user k is, for example, a rule (or function) $\mathcal{F}_k: \mathbb{C}^{1\times L} \rightarrow \{\pm 1\}^B$, the encoder of user k receives $\widetilde{y_k} \in \mathbb{C}^{1\times L}$ as an input and outputs B information bits. In other words, the feedback bits of user k may be expressed as $q_k = \mathcal{F}_k(\widetilde{y_k})$. The decoder in FIG. 10 may receive feedback bits $$q \triangleq [q_1^T, \cdots, q_K^T]^T$$

collected from all K users as an input and generate a precoding matrix $V \in \mathbb{C}^{M\times K}$ as an output. In this case, the DL precoding scheme of the BS may be represented by a function $\mathcal{P}: \{\pm 1\}^{KB} \rightarrow \mathbb{C}^{M\times K}$.

The objective of the end-to-end multiuser precoding system illustrated in FIG. 10 may be summarized as the following sum rate maximization problem. Various communication QoS metrics besides the sum rate may be used as the objective function for the end-to-end multiuser precoding system.

$$\underset{\tilde{X},\{\mathcal{F}_k(\cdot)\forall k,\mathcal{P}(\cdot)}{\text{maximize}} \sum_{k=1}^{K} \log_2\left(1 + \frac{|h_k^H v_k|^2}{\sum_{j\neq k} |h_k^H v_j|^2 + \sigma^2}\right) \quad \text{[Equation 3]}$$

$$\text{subject to } V = \mathcal{P}([q_1^T, \ldots, q_K^T]^T),$$

$$q_k = \mathcal{F}_k(h_k^H \tilde{X} + \tilde{z}_k), \forall k,$$

$$Tr(VV^H) \leq P,$$

$$\|\tilde{x}_\ell\|_2^2 \leq P, \forall \ell$$

In particular, Equation 3 represents the problem of maximizing the sum rate in a limited-feedback FDD system. Designing an end-to-end multiuser precoding system as represented in Equation 3 may be seen as finding combinations to maximize the sum rate (or optimize other QoS metrics) for the following three factors:

$\tilde{X}$: downlink training pilots $\{\mathcal{F}_k(\cdot)\}_{\forall k}$: feedback schemes at users $\mathcal{P}(\cdot)$: precoding scheme at BS Thus, not only the feedback schemes used by each user and the precoding schemes adopted by the BS but also the training pilots $\tilde{X}$ transmitted by the BS are variables for optimization.

Deep learning may be used as a method of finding an optimized end-to-end FDD DL precoding system. In other words, the DL training pilots $\tilde{X}$, the feedback schemes $\{\mathcal{F}_k(\cdot)\}_{\forall k}$, and the precoding scheme $\mathcal{P}(\cdot)$ may all be configured with an NN, and the configured NN may be trained to determine optimal NN parameters.

Figure 11:
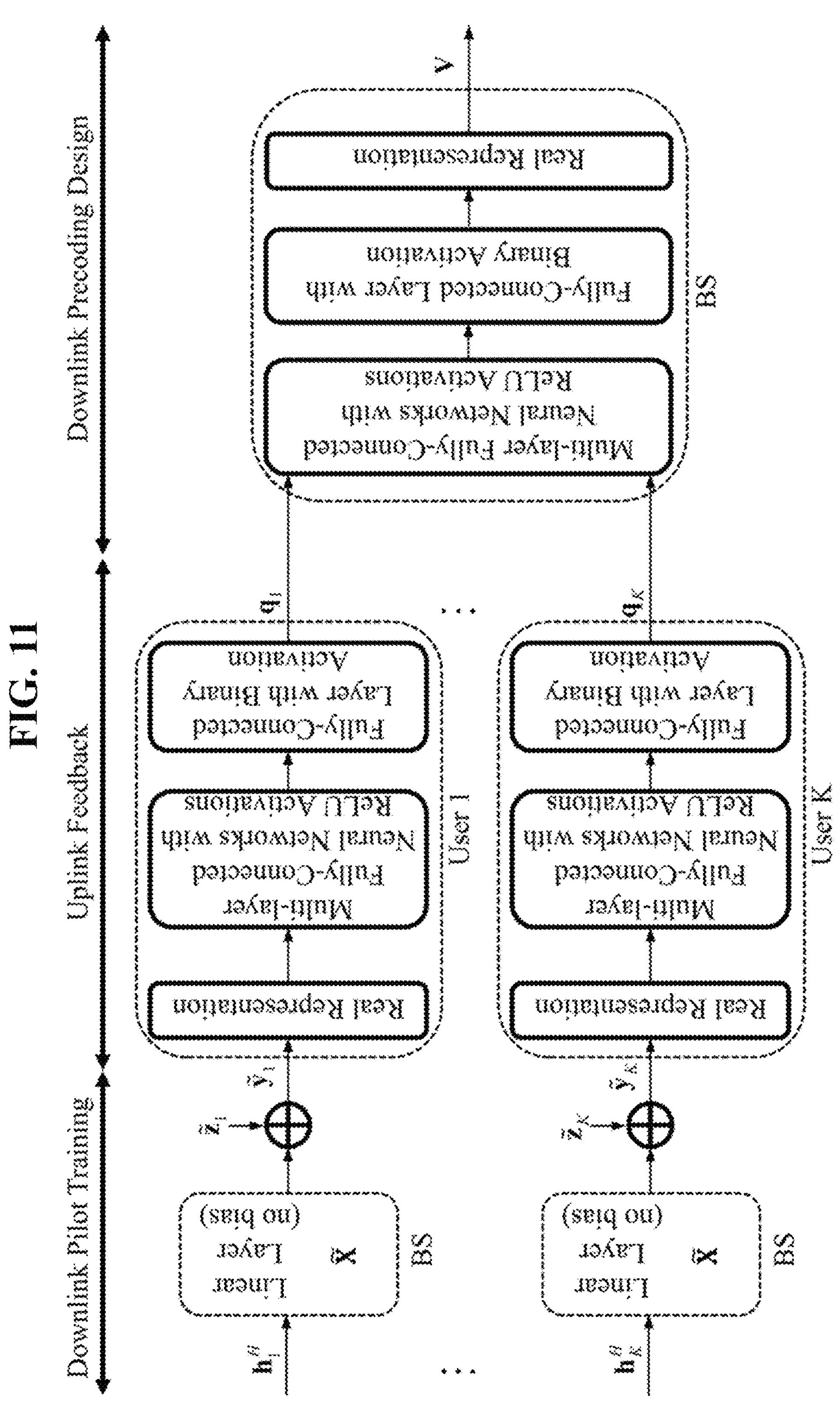
FIG. 11 illustrates an exemplary possible neural network (NN) architecture when an end-to-end multiuser precoding system is represented with an NN.

FIG. 11 illustrates an exemplary possible NN architecture when an end-to-end multiuser precoding system is represented with an NN.

A binary activation layer may be used as in the example shown in FIG. 11 such that a binary output is produced by the final layer of a user-side encoder NN (i.e., such that each element of $q_k \in \{\pm 1\}^B$ is a bipolar feedback bit).

Figures 12, 13:
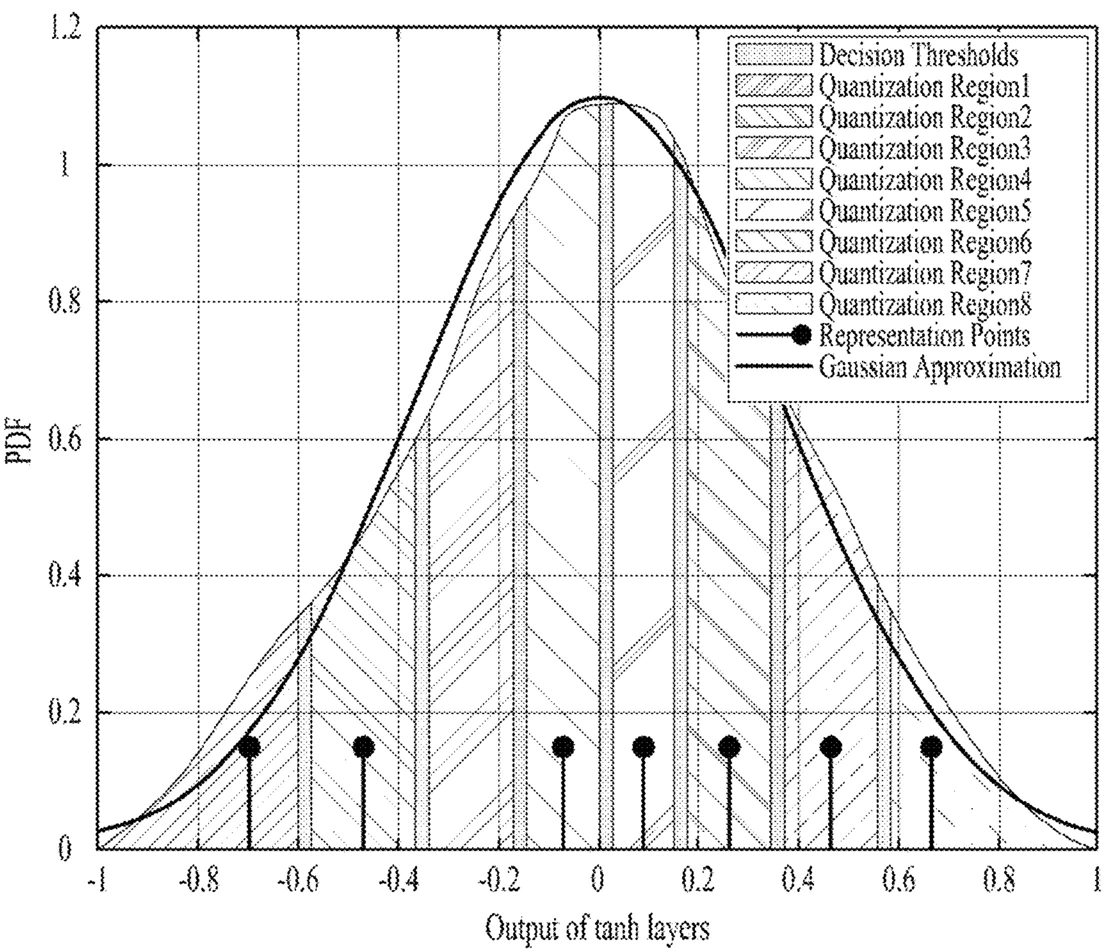
FIG. 12 illustrates a signum function available for an encoder NN according to the present disclosure.
FIG. 13 illustrates a probability density function (PDF) for outputs of a user-side encoder NN and values quantized for the PDF.

FIG. 12 illustrates a signum function available for an encoder NN according to the present disclosure.

The sign function (or signum function) shown in FIG. 12 may be used as the activation function for the final layer of the encoder NN of FIG. 12.

However, in the NN structure shown in FIG. 11, when a feedback capacity B (i.e., the number of feedback bits) varies, the number of neurons in the final layer of each user-side encoder NN needs to change. Thus, a generalized method for allowing the use of a common NN structure for users regardless of the number of feedback bits B may be needed. That is, it is possible to consider an end-to-end multiuser DL precoding system where the same neural network structure is capable of being used even if the feedback rate limit B changes For the common NN structure with respect to the number of feedback bits B, the NN structure may need to be modified as shown in the example of FIG. 11. For example, it may be considered to replace the activation function in the final layer of each user-side encoder neural network from the signum function to the hyperbolic tangent (hereinafter tanh) function and configure the final output layer of each user-side encoder neural network to have S neurons. In this case, other functions besides the tanh function may also be used as the activation function, and each encoder may produce S soft-valued outputs. When the tanh function is used as the activation function, values coming from the S neurons are real numbers ranging from −1 to 1.

If S real numbers are generated for each user, each of the real numbers may be quantized to be represented by Q bit(s). In this case, each user performs feedback using B=S×Q bits. Therefore, even though the dimension of the output of each user-side encoder NN is fixed to S, flexible feedback rates may be supported even for a fixed NN structure by adjusting Q according to the number of feedback bits per user B.

In this case, an appropriate quantizer is needed. To design a quantizer that quantizes output values of the encoder NN, it is assumed that the modified overall NN structure (i.e., the entire NN structure where the output of the user-side encoder NN is no longer binary but real numbers) is adequately trained. After training is completed, an empirical probability density function (PDF) may be obtained for the output of the user-side encoder NN. In some implementations of the present disclosure, the quantizer may be designed by applying the Lloyd-Max algorithm to the empirical PDF. However, other methods besides the Lloyd-Max algorithm may also be used to design the quantizer.

FIG. 13 illustrates a PDF for outputs of a user-side encoder NN and values quantized for the PDF. In particular, FIG. 13 shows an empirical PDF of a (modified) user-side encoder NN and a 3-bit quantizer designed by applying the Lloyd-Max algorithm to the empirical PDF.

In the example in FIG. 13, a total of eight quantization regions are distinguished by seven decision thresholds. In FIG. 13, representative points (i.e., representative levels) corresponding to each quantization region are indicated. In other words, the example in FIG. 13 illustrates quantization rules for the 3-bit quantizer. The quantization rules refer to the following partitions and codebooks.

>Partition: Decision thresholds (and quantization regions separated by the decision thresholds)

>Codebook: Representative levels (i.e., representative points)

Figure 14:
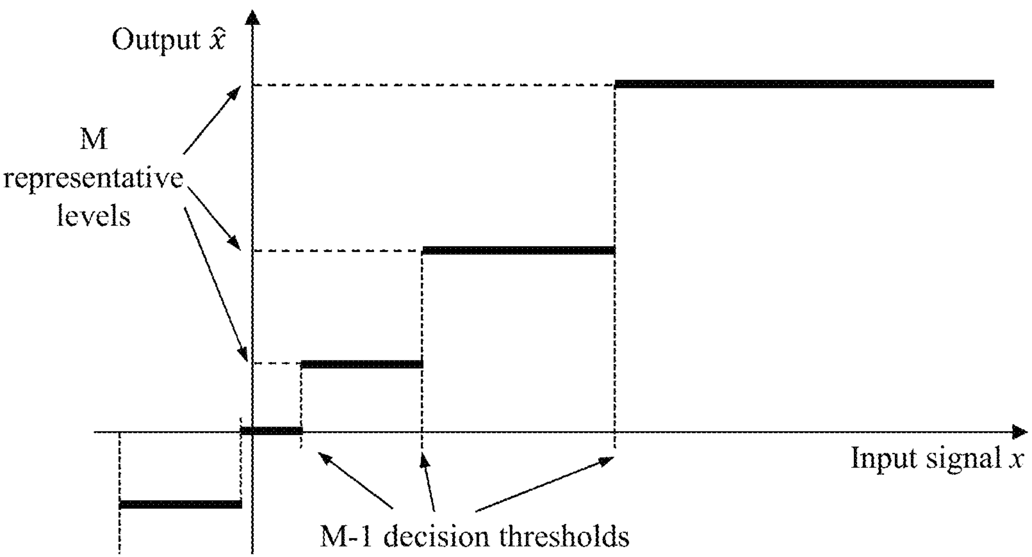
FIG. 14 illustrates quantization rules.

FIG. 14 illustrates quantization rules.

In the Lloyd-Max quantizer, decision thresholds are, for example, exactly halfway between representative levels. The decision thresholds may be calculated as follows.

$$t_q = \frac{1}{2}(\hat{x}_{q-1} + \hat{x}_q) \quad q = 1, 2, \ldots, M-1 \qquad \text{[Equation 4]}$$

In the Lloyd-Max quantizer, representative levels lie at the centroid of a PDF between two successive decision thresholds. The representative levels may be calculated as follows.

$$\hat{x}_q = \frac{\int_{t_q}^{t_{q+1}} x \cdot f_X(x)dx}{\int_{t_q}^{t_{q+1}} f_X(x)dx} \quad q = 0, 1, \ldots, M-1 \qquad \text{[Equation 5]}$$

Assuming that both the user-side and BS-side are aware of the quantization rules, the outputs of each user-side encoder NN (e.g., S real numbers) may be quantized into Q bits according to the quantization rules and transmitted to the BS. Therefore, each user may transmit B=S×Q bits. The BS may then receive the B bits transmitted from each user and restore the B bits into S real numbers according to the quantization rules (where each number corresponds to one of the $2^Q$ representative levels in a codebook). The total of K×S real numbers received and restored from K users may be input to the BS-side decoder NN. In this case, an input signal of the BS-side decoder NN consists of Q-bit quantized versions of an output signal (S real numbers) from each user-side encoder NN.

In this case, while the parameters of each user-side encoder NN (e.g., the weight(s) and bias(es) of the NN) remain fixed, the parameters of the BS-side decoder NN are trained such that the BS-side decoder NN outputs the optimal precoding matrix. For training, data input to the BS-side decoder NN consists of the Q-bit quantized versions of the output signal (S real numbers) from each user-side encoder NN. It is assumed that the modified overall NN structure (where the output of the user-side encoder NN is no longer binary but real numbers) is adequately trained. Therefore, the user-side encoder NN in the entire NN structure may use the already trained parameters. Before quantization, the BS-side decoder NN is trained to handle dequantized errors as input signals. Therefore, it is necessary to retrain the BS-side decoder NN to accommodate quantized versions of inputs. For example, i) the encoder NN, which originally outputs B binary bits, is modified to output S soft-valued outputs, i.e., S real-valued numbers and then trained (without applying the quantizer) to obtain the parameters of the encoder NN and the parameters of the decoder NN; and ii) the quantizer may be applied in a state where feedback is possible with the S real-valued numbers (i.e., after completing step i)). After quantizing the real-valued numbers generated by the encoder NN, values obtained by dequantizing the real-valued numbers are input to the decoder NN. In this case, the differences between the values output by the encoder NN and the values input to the decoder NN are quantization errors (i.e. the differences between the input and output of the quantizer). In some implementations of the present disclosure, real-valued numbers outputted by the encoder NN are quantized and then dequantized to obtain the Q-bit quantized version thereof. That is, the quantized versions of real-valued outputs are input into the decoder NN. While the quantized versions of the real-valued outputs are similar to the soft-value outputs produced by the encoder NN, there may be differences. Once the BS-side decoder NN is sufficiently trained, the encoder/decoder NN of both the user and BS sides may be deployed for DL precoding in actual communication.

According to the above method, even if the feedback capacity B varies, a common encoder and decoder NN pair may be used.

Figure 15:
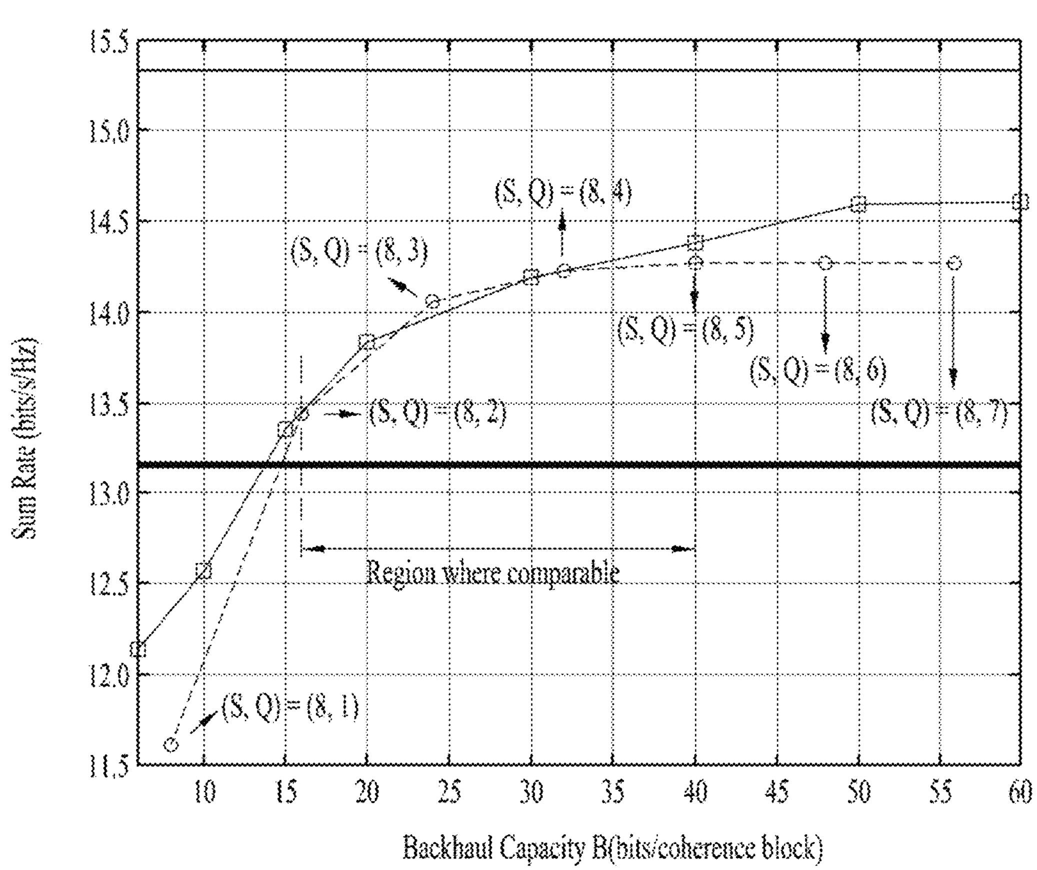
FIG. 15 illustrates precoding performance for a case where a common NN pair is used for a feedback capacity and a case where different NN pairs are used for the feedback capacity.

FIG. 15 illustrates precoding performance for a case where a common NN pair is used for the feedback capacity B and a case where different NN pairs are used for the feedback capacity B. In particular, FIG. 15 shows a comparison of precoding performance (e.g., aggregate rate) between two cases: a case where different encoder and decoder NN pairs are used for changes in the feedback capacity B as B binary outputs are produced at the final layer of the user-side encoder NN (see the line labeled "Different DNNs trained for each B" in FIG. 15); and a case where a common encoder and decoder NN pair is used, regardless of changes in the feedback capacity B as a fixed number of S real-valued outputs are produced at the final layer of the user-side encoder NN (see the line labeled "Common DNN trained for all B" in FIG. 15).

Unlike the case where different NN pairs are used for changes in the feedback capacity B, when the common NN pair is used, it is possible to operate an end-to-end multiuser precoding system by quantizing a fixed number of S real-valued outputs into Q bit(s) according to the feedback capacity B, which is based on B=S×Q.

As illustrated in FIG. 15, when using the common encoder and decoder NN pair, there may be a region where comparable precoding performance (e.g., aggregate rate) is observed compared to the case where different NN pairs are used for changes in the feedback capacity B. However, when using the common encoder and decoder NN pair, comparable performance may only be achieved within a specific region of the feedback capacity B, as indicated by a region labeled "Region where comparable" in FIG. 15. If the value of the feedback capacity B falls outside of the region, there may be differences in precoding performance. In addition, as the feedback capacity B moves further away from the region, the performance differences increase due to the feedback capacity B compared to when using different NN pairs for changes in the feedback capacity B. In other words, there are limitations to the generalizability of the end-to-end multiuser precoding NN system in terms of the feedback capacity B.

Accordingly, an operational method of operating an end-to-end multiuser precoding system adjustable to the feedback capacity to overcome the above limitations will be described For the sake of explanation, it is assumed that NN parameters of the end-to-end multiuser precoding system are sufficiently trained offline and NNs are deployed in a specific precoding system where the highest level of precoding performance is expected. In addition, it is assumed that multiple encoder and decoder NN pairs are deployed. It is assumed that the BS is aware of an expected precoding performance chart based on the feedback capacity B of specific encoder and decoder NN pairs as shown in the example of FIG. 15. In other words, it is assumed that the BS possesses an expected precoding performance chart based on the feedback capacity B for all possible pairs of encoder and decoder NNs.

In the end-to-end multiuser precoding system described below, encoder and decoder NN pairs are adaptively selected based on changes in the feedback capacity according to some implementations of the present disclosure.

As described earlier, when a common encoder and decoder NN pair is used for all values of the feedback capacity B, regardless of changes in the feedback capacity B, if the feedback capacity B falls outside a specific region, differences in precoding performance arise compared to when using different NN pairs for each value of the feedback capacity B. According to some implementations of the present disclosure, to address the issue that the performance differences increase as the value of B moves further away from the specific region, multiple pairs of encoder and decoder NNs may be deployed at the user and BS sides, and an appropriate encoder and decoder NN pair may be selected and operated depending on the feedback capacity B. In other words, in some implementations of the present disclosure, different pairs of encoder and decoder NNs may be used for different ranges of feedback capacity B.

Figure 16:
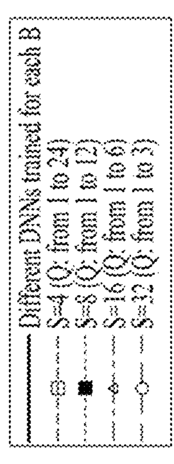
FIG. 16 illustrates precoding performance based on values of a feedback capacity for multiple encoder and decoder pairs.
Figure 16:
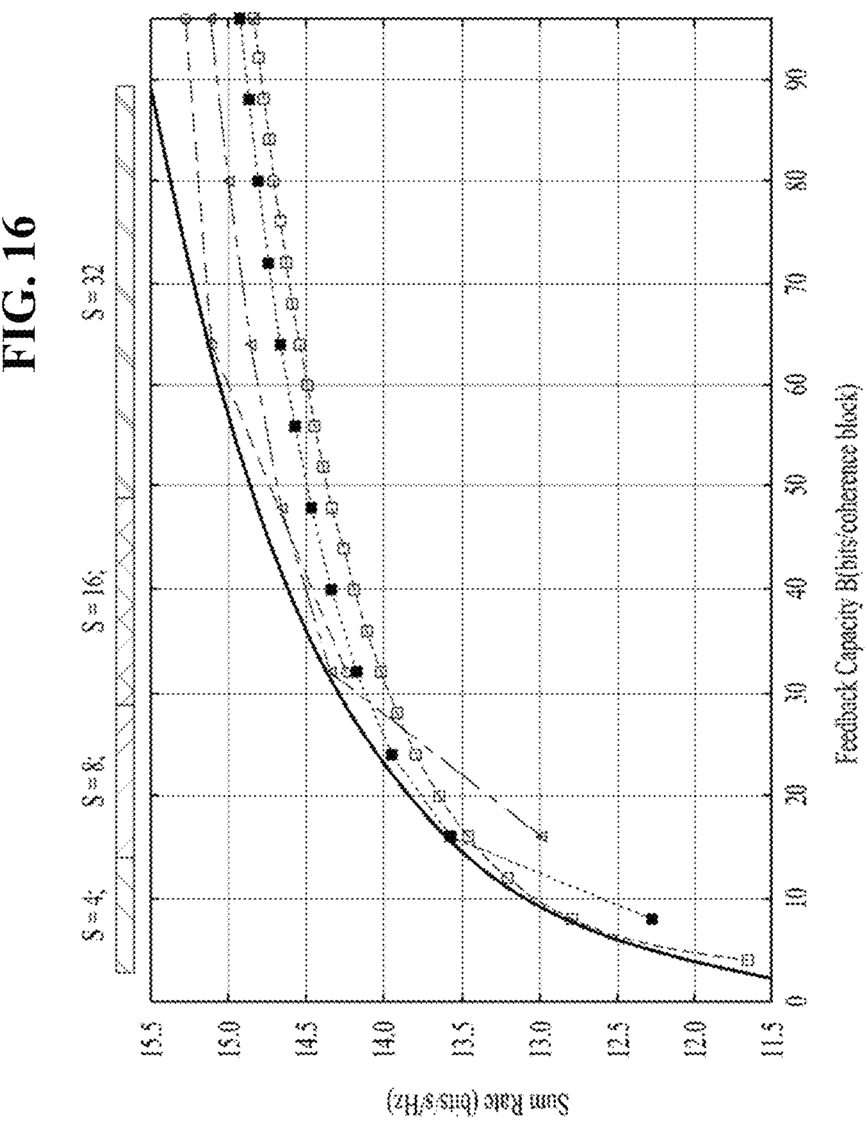

FIG. 16 illustrates precoding performance based on values of the feedback capacity B for multiple encoder and decoder pairs. Specifically, FIG. 16 shows exemplary precoding performance based on values of the feedback capacity B for a total of four encoder and decoder candidate pairs. The values of S shown in FIG. 16 and the ranges of the feedback capacity B are merely illustrative. Different values of S other than those shown in FIG. 16 may be used, and different ranges of B than those shown in FIG. 16 may also be used.

In FIG. 16, the performance when different encoder and decoder NN pairs are used for changes in the feedback capacity B is illustrated as a sort of upper bound (see the line "Different DNNs trained for each B" in FIG. 16). The precoding performance graph in FIG. 16 shows a modification created arbitrarily by predicting general aspects of precoding performance based on the actual simulation results illustrated in FIG. 15. The precoding performance graph of FIG. 16 shows expected results of precoding performance, which are derived from actual simulation results illustrated in FIG. 15. Therefore, the values in FIG. 16 may be different from the actual simulation results. Herein, for convenience of explanation, the expected precoding performance is assumed as shown in FIG. 16.

In the end-to-end multi-user precoding system according to some implementations of the present disclosure, it may be considered that expected precoding performance charts for each possible encoder and decoder NN pair exist at the BS side, which depend on the feedback capacity B as described above. For example, a situation where the BS is aware of a chart similar to the chart illustrated in FIG. 16 may be considered. In the present disclosure, a chart or table showing the relationship between the precoding performance of encoder and decoder NN pairs depending on the feedback capacity B or the relationship therebetween is defined as an expected precoding performance chart.

In the end-to-end multiuser precoding system according to some implementations of the present disclosure, the BS may select an encoder and decoder NN pair expected to have the highest precoding performance among multiple encoder and decoder NN candidate pairs with reference to the expected precoding performance chart. The key features for distinguishing multiple encoder and decoder NN pairs could be the number of neurons in the output layer of the user-side encoder NN.

For example, FIG. 16 shows a situation where a total of four NN pairs with different values of S exist except for cases where different encoder and decoder NN pairs are used for changes in the feedback capacity B (see the upper bound curves shown in FIG. 16). That is, the number of neurons in the last output layer of the user-side encoder NN, denoted as S, may be used to distinguish the types of encoder and decoder NN pairs.

Hereinafter, for the sake of explanation, it is assumed that the type of user-side encoder NN is solely identified by the number of neurons in the last output layer of the user-side encoder NN. In other words, in the present disclosure, it is assumed that changes in S and changes in the type of user-side encoder NN are mutually sufficient and necessary conditions for each other. If there is other information besides S that distinguishes the type of user-side encoder NN, signaling of the other information may be included in the implementation examples of a signaling procedure, which will be described later.

For the sake of explanation, it is assumed that the BS side is aware of all possible quantization rules for the outputs of all types of user-side encoder NNs in advance. In addition, it is also assumed that when the type of encoder NN (e.g., the value of S) and the number of quantization bits Q are determined, the quantization rules are uniquely determined. In situations where the above assumptions are not valid, additional signaling may be required for the BS side to know what quantization rules are being used by the user side.

The encoder and decoder NN pair with the best precoding performance among multiple NN pairs is illustrated at the top of the expected precoding performance chart shown in FIG. 16. Generally, there is a region where each NN pair has the best precoding performance as shown in FIG. 16. In some implementations of the present disclosure, since the BS side has the expected precoding performance chart, the BS is aware of the regions where each NN pair shows the best precoding performance. Therefore, the BS may select the NN pair with the best precoding performance based on the feedback capacity B.

In some implementations of the present disclosure, it is assumed that the BS side has the expected precoding performance chart. However, there may be special cases where the expected precoding performance chart exists only at the user side and not at the BS side. Thus, implementations of the present disclosure are divided into two main categories depending on whether the expected precoding performance chart exists at the BS side.

Example 1) when Expected Precoding Performance Chart does not Exist on BS Side

In Example 1, some implementations of the present disclosure will be described for exceptional cases where an expected precoding performance chart does not exist at the BS side. Except for Example 1, the implementations of the present disclosure assume that at least the BS has the expected precoding performance chart. Therefore, Example 1 is an exceptional case.

Figure 17:
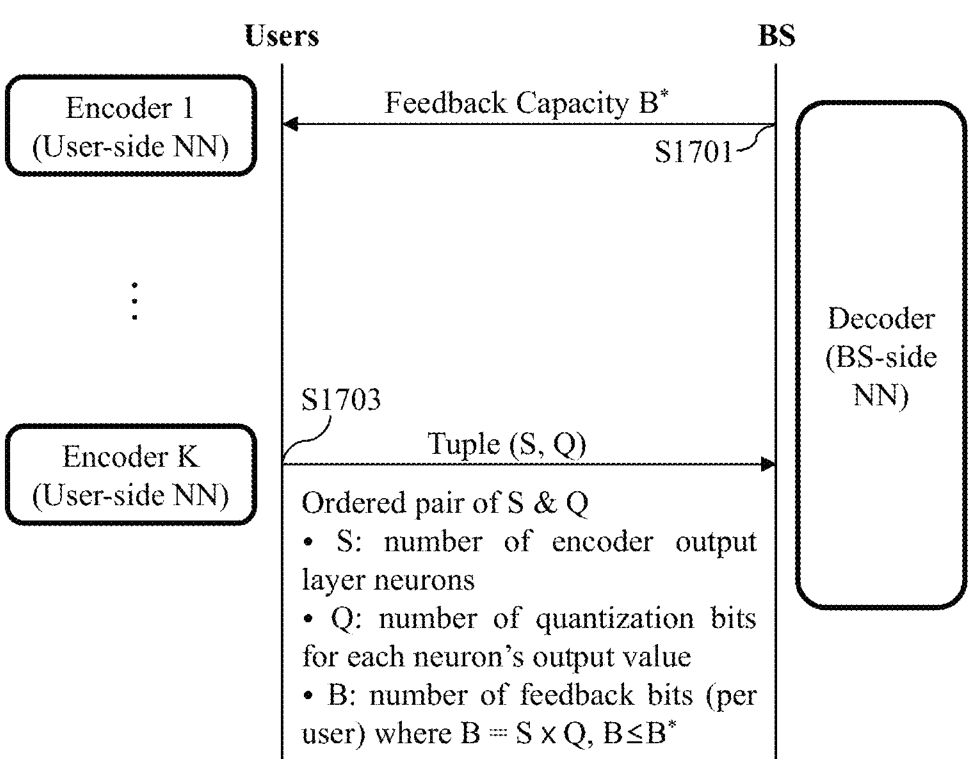
FIG. 17 illustrates an exemplary signaling procedure for an end-to-end multi-precoding system according to some implementations of the present disclosure.

FIG. 17 illustrates an exemplary signaling procedure for an end-to-end multi-precoding system according to some implementations of the present disclosure. In particular, FIG. 17 shows a procedure for exchanging necessary information between the user side and the BS side to select one encoder and decoder NN pair among encoder and decoder NN pairs in the end-to-end multiuser precoding system when the expected precoding performance chart does not exist at the BS side. The signaling procedure in FIG. 17 is merely one example, and it is not necessary to follow all the steps of the procedure exactly. Some steps of the procedure may be performed, or additional steps not shown in the drawing may be required. In addition, the sequence of signaling steps shown in FIG. 17 may vary, and some signaling steps may be omitted.

Referring to FIG. 17, the BS side may calculate a feedback capacity B* by considering the quality of a link (or channel) from each user. For example, the feedback capacity may be defined as the maximum amount of information (e.g., the number of bits) that the user is capable of transmitting to the BS as feedback during a certain period (e.g., coherence block). The BS may inform each user of the calculated feedback capacity B* (S1701). The feedback capacity B* may vary for each user. There may be a tendency for the feedback capacity B* to increase as the state of the link (or channel) improves.

Since the feedback capacity B* is known at each user side, an ordered pair (S, Q) satisfying B=S×Q for B≤B* may be selected, where B represents the number of (per-user) feedback bits. In general, as B increases, it is possible to provide more detailed information as feedback, which may be advantageous in terms of precoding performance. S represents the number of neurons in the last output layer of the user-side encoder NN. If there are multiple candidates for the user-side encoder NN (having different numbers of neurons in the output layer) at each user side, an encoder NN with an appropriate value of S among the encoder NN candidates may be selected. Subsequently, a decoder NN suitable for to selected encoder NN may be selected at the BS side. Thus, the end-to-end multiuser precoding system may select the encoder and decoder NN pair. When there is only one NN at the user side, the number of neurons in the output layer for the NN is naturally selected as an appropriate value of S. Q indicates how many bits are used to quantize output values from each neuron. If the ordered pair (S, Q) is known, the value of B may be obtained from B=S×Q. Thus, each user side may transmit the ordered pair (S, Q) to the BS (S1703).

It is possible to determine the value of B satisfying B≤B* based on (S, Q). Different ordered pairs (S, Q) with the same value of B may have different precoding performance (e.g., different aggregate rates). Thus, if the expected precoding performance chart exists at the user side, the user side may select an encoder NN expected to have the best precoding performance among encoder NN candidates and an ordered pair (S, Q) related thereto based on the expected precoding performance chart, thereby selecting the appropriate ordered pair (S, Q). The selected ordered pair (S, Q) may be transmitted from the user side to the BS side (S1703). The BS side may receive the ordered pair (S, Q) and select a decoder NN suitable for the user-side encoder NN. In addition, the BS side may know which quantization rules are used at the user side based on the ordered pair (S, Q). The BS side may apply dequantization in the same way as the quantization rules used at the user side and restore B feedback bits per user into S real numbers for future reception.

Example 2) when BS Side has Expected Precoding Performance Chart

In Example 2, implementations of the present disclosure will be described depending on whether an expected precoding performance chart exists not only at the BS side but also at the user side. The BS side may have an expected precoding performance chart including the expected performance for all types of user-side encoder NNs for all possible cases. In the present disclosure, the chart including the expected performance for all possible cases is referred to as a whole expected precoding performance chart. In Example 2, cases where the BS side has the whole expected precoding performance chart may be considered.

Example 2-1) when User Side Also has Expected Precoding Performance Chart

Figure 18:
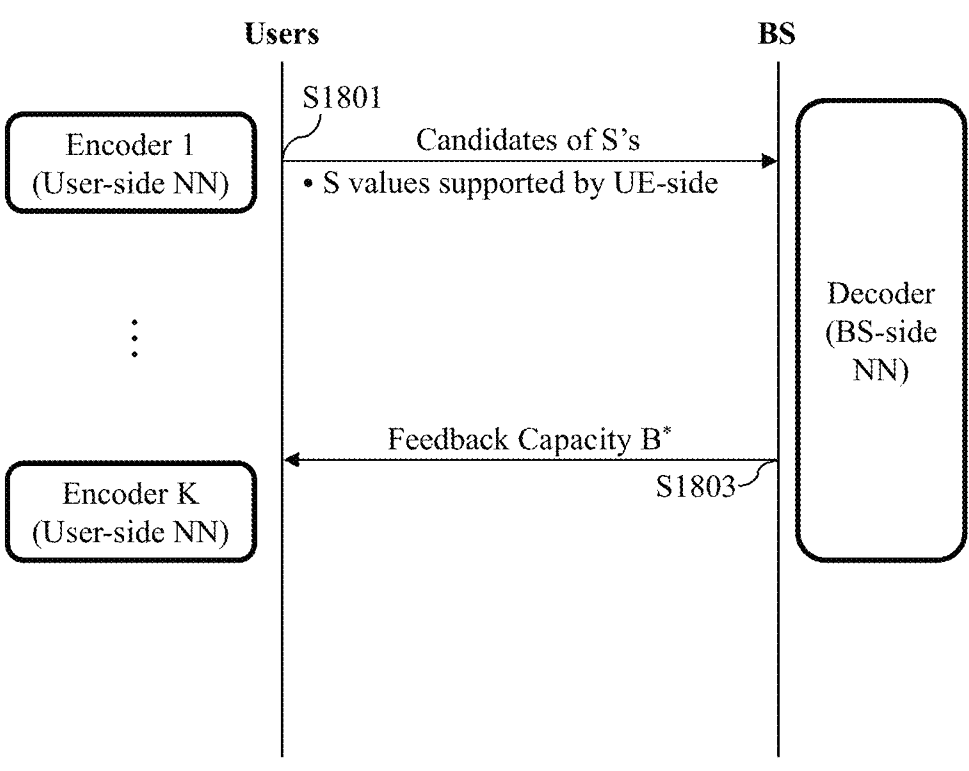
FIG. 18 illustrates another exemplary signaling procedure for an end-to-end multi-precoding system according to some implementations of the present disclosure.

FIG. 18 illustrates another exemplary signaling procedure for an end-to-end multi-precoding system according to some implementations of the present disclosure. In particular, FIG. 18 shows a procedure for exchanging necessary information between the user side and the BS side to select one encoder and decoder NN pair among encoder and decoder NN pairs in the end-to-end multiuser precoding system when the expected precoding performance chart exist not only at the BS side but also on the UE side. The signaling procedure in FIG. 18 is merely one example, and it is not necessary to follow all the steps of the procedure exactly. Some steps of the procedure may be performed, or additional steps not shown in the drawing may be required. In addition, the sequence of signaling steps shown in FIG. 18 may vary, and some signaling steps may be omitted.

The BS side may inform each user of a calculated feedback capacity B*, and the procedure may be the same as what has been described in Example 1 (S1803) (see the description of S1701 in FIG. 17). However, before the BS side informs each user of the feedback capacity B*, the user side may transmit to the BS side the values of S supported by the user side such that the BS side is capable of knowing the types of encoder NNs the user side has (S1801). The BS side may select and consider the expected performance of encoder NNs corresponding to the values of S supported by the user side from the whole expected precoding performance chart. The user side also knows the expected precoding performance chart for the encoder NNs supported by the user side. Therefore, even if the user side only receives the feedback capacity B* from the BS side, the user side may select an encoder NN. In other words, the user side may select the encoder NN based on both the feedback capacity received from the BS side and the expected precoding performance chart the user side knows. Since the BS side knows the types of encoder NNs supported by the user side and the expected precoding performance chart therefor, the BS side may know the encoder NN the user side selects when determining the feedback capacity.

In Example 2-1, both the user side and the BS side have the expected precoding performance chart. Thus, when the feedback capacity is determined and the type of encoder NN (e.g., the value of S) is determined, the number of quantization bits Q may also be automatically determined based on the feedback capacity and the type of encoder NN (e.g., the value of S).

Example 2-2) when User Side does not have Expected Precoding Performance Chart

Figure 19:
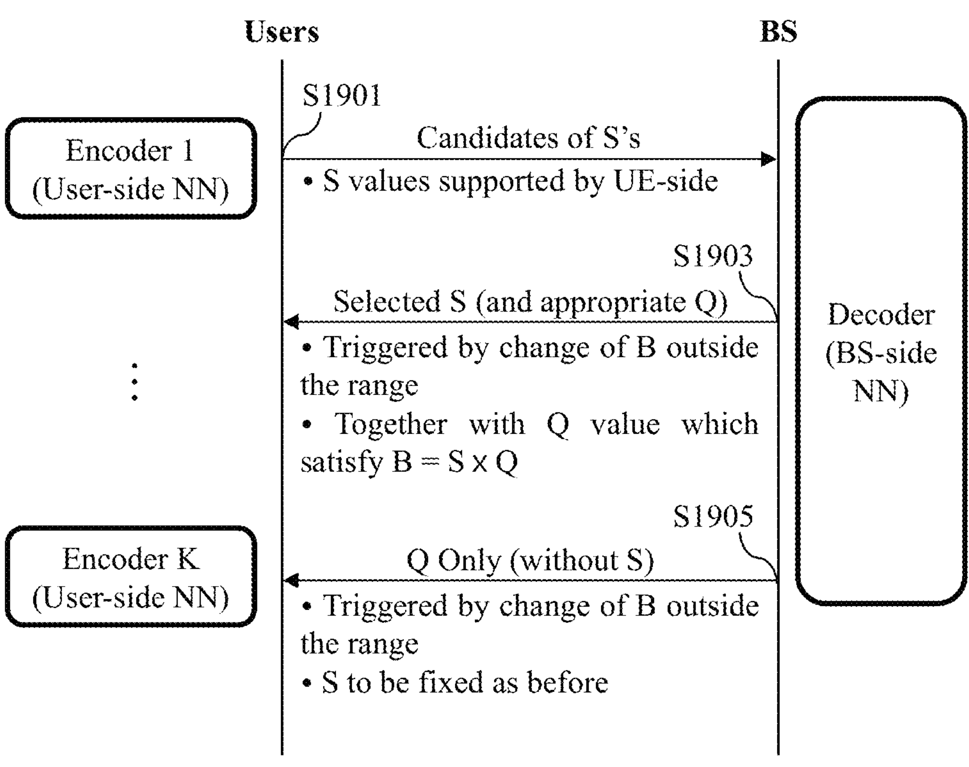
FIG. 19 illustrates further another exemplary signaling procedure for an end-to-end multi-precoding system according to some implementations of the present disclosure.

FIG. 19 illustrates further another exemplary signaling procedure for an end-to-end multi-precoding system according to some implementations of the present disclosure. In particular, FIG. 19 shows a procedure for exchanging necessary information between the user side and the BS side to select one encoder and decoder NN pair among encoder and decoder NN pairs in the end-to-end multiuser precoding system when the precoding performance chart exists only at the BS side and not at the user side. The signaling procedure in FIG. 19 is merely one example, and it is not necessary to follow all the steps of the procedure exactly. Some steps of the procedure may be performed, or additional steps not shown in the drawing may be required. In addition, the sequence of signaling steps shown in FIG. 19 may vary, and some signaling steps may be omitted.

The user side may transmit the values of S supported by the user side to the BS side and inform the BS side the types of encoder NNs the user side has (S1901). The BS side may select and consider the expected performance of encoder NNs corresponding to the values of S supported by the user side from the whole expected precoding performance chart. The steps up to this point are the same as in Example 2-1. However, since there is no expected precoding performance chart on the user side, the BS side needs to inform the user side of the types of encoder NNs (e.g., values of S) to be used by the user side and quantization rules (e.g., values of Q).

The BS side may select the value of S expected to have the best precoding performance at the current feedback capacity (B≤B*) based on an expected precoding performance chart obtained by selecting only the expected performance of encoder NNs corresponding to the values of S supported by the user side from the whole expected precoding performance chart. Once the value of S is selected from the expected precoding performance chart, the value of Q satisfying B=S×Q may be determined automatically. In this case, B* represents the maximum amount of information (e.g., the number of bits) that the user is capable of transmitting to the BS as feedback during a certain period (e.g., coherence block). The selected values of S and Q may be values where the best precoding performance is expected in the expected precoding performance chart among the values that satisfy B≤B* and B=S×Q.

The BS side may transmit the selected value of S to the user side (S1903). If the value of S changes due to changes in the feedback capacity B*, signaling for the BS side to inform the user side of the selected values of S and Q is needed. The signaling may be generated when the feedback capacity changes to the extent that each NN pair (e.g., the value of S) moves away from the region with the best precoding performance (see the regions indicated at the top of the expected precoding performance chart in FIG. 16).

If the use of the current NN pair (e.g., values of S) yields the best precoding performance despite changes in the feedback capacity, the BS side may reconfigure only the value of Q according to the changed feedback capacity and then inform the user side of the reconfigured value of Q (S1905). If the feedback capacity changes only to the extent that each NN pair (e.g., the value of S) does not move away from the region with the best precoding performance, the BS side may simply reconfigure only the value of Q and inform the user side of the reconfigured value of Q based on the expected precoding performance chart while keeping the value of S unchanged as before. That is, there is no need for the BS side to inform the user side of the value of S.

According to some implementations of the present disclosure, multiple encoder-decoder NN pairs operate adaptively in response to changes in the feedback capacity, thereby ensuring relatively robust precoding performance For transmission of a CSI report, a transmitting device may perform operations according to some implementations of the present disclosure. The transmitting device may include: at least one transceiver; at least one processor; and at least one computer memory operably connected to the at least one processor and configured to store instructions that, when executed, cause the at least one processor to perform the operations according to some implementations of the present disclosure. A processing device for the transmitting device may include: at least one processor; and at least one computer memory operably connected to the at least one processor and configured to store instructions that, when executed, cause the at least one processor to perform the operations according to some implementations of the present disclosure. A computer-readable (non-transitory) storage medium may be configured to store at least one computer program including instructions that, when executed by at least one processor, cause the at least one processor to perform the operations according to some implementations of the present disclosure. A computer program or computer program product may include instructions stored on at least one computer-readable (non-transitory) storage medium and, when executed, cause (at least one processor) to perform the operations according to some implementations of the present disclosure.

For the transmitting device, processing device, computer-readable (non-transitory) storage medium, and/or computer program product, the operations may include: determining an encoder with S outputs among encoders supported by the transmitting device based on a number of feedback bits B, where B=S×Q; outputting S real-valued numbers by encoding the CSI through the encoder; determining B-bit encoded CSI including Q bits representing a respective one of the S real-valued numbers, respectively; and transmitting the B-bit encoded CSI. The encoders may have different numbers of outputs and be predetermined for different ranges of numbers of feedback bits.

In some implementations, the operations may further include transmitting information on the encoders.

In some implementations, the information on the encoders may include a number of outputs supported by the transmitting device.

For reception of a CSI report, a receiving device may perform operations according to some implementations of the present disclosure. The receiving device may include: at least one transceiver; at least one processor; and at least one computer memory operably connected to the at least one processor and configured to store instructions that, when executed, cause the at least one processor to perform the operations according to some implementations of the present disclosure. A processing device for the receiving device may include: at least one processor; and at least one computer memory operably connected to the at least one processor and configured to store instructions that, when executed, cause the at least one processor to perform the operations according to some implementations of the present disclosure. A computer-readable (non-transitory) storage medium may be configured to store at least one computer program including instructions that, when executed by at least one processor, cause the at least one processor to perform the operations according to some implementations of the present disclosure. A computer program or computer program product may include instructions stored on at least one computer-readable (non-transitory) storage medium and, when executed, cause (at least one processor) to perform the operations according to some implementations of the present disclosure.

For the receiving device, processing device, computer readable (non-transitory) storage medium, and/or computer program product, the operations may include: determining a decoder with S inputs for each of transmitting devices among decoders supported by the receiving device based on a number of feedback bits B (e.g., determining a decoder with K×S inputs for K transmitting devices); receiving B-bit encoded CSI from a transmitting device; determining S real-valued numbers based on S×Q bits in the encoded CSI; and determining a precoding matrix by decoding the S real-valued numbers through the decoder. The decoders may have different numbers of inputs and be predetermined for different ranges of numbers of feedback bits. In some implementations, the operations may further include receiving information regarding encoders supported by the transmitting device from the transmitting device.

In some implementations, the information regarding the encoders may include a number of outputs supported by the transmitting device.

In some implementations, the operations may further include performing DL transmission to the transmitting device based on the precoding matrix.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

What is claimed is:

1. A method of transmitting channel state information (CSI) by a transmitting device in a wireless communication system, the method comprising:

determining an encoder with S outputs among encoders supported by the transmitting device based on a number of feedback bits B, where B=S×Q;

outputting S real-valued numbers by encoding the CSI through the encoder;

determining B-bit encoded CSI including Q bits representing a respective one of the S real-valued numbers; and transmitting the B-bit encoded CSI, wherein the encoders have different numbers of outputs and are predetermined for different ranges of numbers of feedback bits.

2. The method of claim 1, further comprising:

transmitting information regarding the encoders to a receiving device.

3. The method of claim 2, wherein the information regarding the encoders includes a number of candidate outputs supported by the transmitting device.

4. A method of receiving channel state information (CSI) by a receiving device in a wireless communication system, the method comprising:

determining a decoder with S inputs for each of transmitting devices among decoders supported by the receiving device based on a number of feedback bits B, where B=S×Q;

receiving B-bit encoded CSI from a transmitting device;

determining S real-valued numbers based on S×Q bits in the encoded CSI; and determining a precoding matrix by decoding the S real-valued numbers through the decoder, wherein the decoders have different numbers of inputs and are predetermined for different ranges of numbers of feedback bits.

5. The method of claim 4, further comprising:

receiving information regarding encoders supported by the transmitting device from the transmitting device.

6. The method of claim 5, wherein the information regarding the encoders includes a number of candidate outputs supported by the transmitting device.

7. The method of claim 4, further comprising:

performing downlink transmission to the transmitting device based on the precoding matrix.

8. A transmitting device configured to transmit channel state information (CSI) in a wireless communication system, the transmitting device comprising:

at least one transceiver;

at least one processor; and at least one computer memory operably connected to the at least one processor and configured to store instructions that, when executed, cause the at least one processor to perform operations comprising:

determining an encoder with S outputs among encoders supported by the transmitting device based on a number of feedback bits B, where B=S×Q;

outputting S real-valued numbers by encoding the CSI through the encoder;

determining B-bit encoded CSI including Q bits representing a respective one of the S real-valued numbers; and transmitting the B-bit encoded CSI, wherein the encoders have different numbers of outputs and are predetermined for different ranges of numbers of feedback bits.

9. A receiving device configured to receive channel state information (CSI) in a wireless communication system, the receiving device comprising:

at least one transceiver;

at least one processor; and at least one computer memory operably connected to the at least one processor and configured to store instructions that, when executed, cause the at least one processor to perform operations comprising:

determining a decoder with S inputs for each of transmitting devices among decoders supported by the receiving device based on a number of feedback bits B, where B=S×Q;

receiving B-bit encoded CSI from a transmitting device;

determining S real-valued numbers based on S×Q bits in the encoded CSI; and determining a precoding matrix by decoding the S real-valued numbers through the decoder, wherein the decoders have different numbers of inputs and are predetermined for different ranges of numbers of feedback bits.

* * * * *